(12) United States Patent
Yokoyama et al.

(10) Patent No.: US 11,396,061 B2
(45) Date of Patent: Jul. 26, 2022

(54) LASER WELDING APPARATUS AND LASER WELDING METHOD

(71) Applicant: Panasonic Intellectual Property Management Co., Ltd., Osaka (JP)

(72) Inventors: Jun Yokoyama, Osaka (JP); Takashi Urashima, Osaka (JP); Daichi Higashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 185 days.

(21) Appl. No.: 16/700,126

(22) Filed: Dec. 2, 2019

(65) Prior Publication Data

US 2020/0198049 A1 Jun. 25, 2020

(30) Foreign Application Priority Data

Dec. 21, 2018 (JP) .............................. JP2018-239654
Dec. 21, 2018 (JP) .............................. JP2018-239682

(51) Int. Cl.
*B23K 26/24* (2014.01)
*B23K 26/03* (2006.01)
(Continued)

(52) U.S. Cl.
CPC ............ *B23K 26/032* (2013.01); *B23K 26/24* (2013.01); *B23K 26/705* (2015.10); *B23K 31/003* (2013.01)

(58) Field of Classification Search
CPC .... B23K 26/032; B23K 26/705; B23K 26/24; B23K 31/003
(Continued)

(56) References Cited

U.S. PATENT DOCUMENTS 2,539,526 A * 1/1951 Sickles ................ H02G 1/1275
                                                                 219/221
3,523,171 A * 8/1970 Belopitov .......... B23K 11/0013
                                                                 219/76.13
(Continued)

FOREIGN PATENT DOCUMENTS

JP          3-207587         9/1991
JP          2004-306100      11/2004
(Continued)

*Primary Examiner* — Jimmy Chou
(74) *Attorney, Agent, or Firm* — McDermott Will & Emery LLP

(57) ABSTRACT

A laser welding apparatus includes: a laser oscillator configured to emit a laser beam toward a welding portion of a welded material; an optical interferometer configured to generate an interference signal that indicates an intensity of an interference beam of a measurement beam reflected by the welding portion and a reference beam; and a derivation unit configured to generate, based on the interference signal, two-dimensional tomographic image data indicating a correlation among a distance in a proceeding direction of welding of the welding portion, a depth of the welding, and an intensity of the interference signal, to extract specified depth tomographic image data within a specified range from the two-dimensional tomographic image data, and to derive a depth for each distance based on the intensity of the interference signal in the specified depth tomographic image data.

9 Claims, 21 Drawing Sheets

(51) Int. Cl.
  *B23K 31/00* (2006.01)
  *B23K 26/70* (2014.01)
(58) Field of Classification Search
  USPC .... 219/617, 121.13, 121.14, 121.83, 121.45, 219/121.46, 121.34, 121.64
  See application file for complete search history.

(56) References Cited

U.S. PATENT DOCUMENTS

| | | | | | |
|---|---|---|---|---|---|
| 4,148,275 | A * | 4/1979 | Benden | | C23C 16/045 118/715 |
| 4,419,562 | A * | 12/1983 | Jon | | B23K 15/0013 219/121.62 |
| 4,428,237 | A * | 1/1984 | Zeger | | G01N 29/48 73/592 |
| 4,541,281 | A * | 9/1985 | Chubachi | | G01H 3/125 73/602 |
| 4,659,224 | A * | 4/1987 | Monchalin | | G01H 9/00 356/502 |
| 4,924,063 | A * | 5/1990 | Buchel | | B23K 26/04 219/121.64 |
| 5,006,694 | A * | 4/1991 | Handke | | B23K 26/702 219/121.6 |
| 5,155,329 | A * | 10/1992 | Terada | | B23K 26/032 219/121.63 |
| 5,161,537 | A * | 11/1992 | Hashimoto | | A61B 8/00 600/447 |
| 5,214,261 | A * | 5/1993 | Zappella | | B28D 1/221 219/121.67 |
| 5,460,451 | A * | 10/1995 | Wadman | | B23K 26/032 219/502 |
| 5,624,588 | A * | 4/1997 | Terawaki | | B23K 9/1272 219/124.34 |
| 5,658,476 | A * | 8/1997 | Gullo | | B23K 26/12 219/121.86 |
| 5,705,554 | A * | 1/1998 | Chou | | C09D 5/18 524/458 |
| 6,007,687 | A * | 12/1999 | Ullman | | C25B 9/65 204/279 |
| 6,084,202 | A * | 7/2000 | Okazaki | | B23K 26/082 219/121.61 |
| 6,084,223 | A * | 7/2000 | Dietz | | B23K 26/032 219/121.64 |
| 6,097,020 | A * | 8/2000 | Karasaki | | B23K 26/03 219/121.61 |
| 6,188,041 | B1 * | 2/2001 | Kim | | B23K 26/034 219/121.6 |
| 6,215,097 | B1 | 4/2001 | Mannava | | |
| 6,555,779 | B1 * | 4/2003 | Obana | | B23K 26/146 219/121.63 |
| 6,635,843 | B1 * | 10/2003 | Takeda | | B23K 11/061 219/105 |
| 6,647,792 | B2 * | 11/2003 | Ogawa | | B82Y 15/00 73/656 |
| 7,396,706 | B2 * | 7/2008 | Sun | | B23K 26/0604 438/132 |
| 7,421,900 | B2 * | 9/2008 | Karasawa | | G01N 29/2437 73/621 |
| 7,591,546 | B2 * | 9/2009 | Morita | | B29C 65/8253 347/84 |
| 7,728,967 | B2 * | 6/2010 | Ochiai | | G01N 29/043 356/237.2 |
| 8,006,560 | B2 * | 8/2011 | Sano | | G01N 29/2418 73/643 |
| 8,094,297 | B2 * | 1/2012 | Ochiai | | G01N 29/2418 356/237.2 |
| 8,115,936 | B2 * | 2/2012 | Ochiai | | G01N 29/043 356/502 |
| 8,329,820 | B2 * | 12/2012 | Hu | | H01B 3/40 525/123 |
| 11,079,218 | B2 * | 8/2021 | Moser | | B23K 26/032 |
| 2003/0218756 | A1 * | 11/2003 | Chen | | G01B 9/02091 356/497 |
| 2005/0023434 | A1 * | 2/2005 | Yacoubian | | G01N 29/30 250/200 |
| 2005/0082267 | A1 * | 4/2005 | Nagai | | B23K 26/03 219/121.82 |
| 2005/0145607 | A1 * | 7/2005 | Troitski | | B44F 1/06 219/121.69 |
| 2005/0162662 | A1 * | 7/2005 | Sauerland | | G01B 9/02023 356/502 |
| 2005/0258149 | A1 * | 11/2005 | Glukhoy | | H05H 1/34 219/121.48 |
| 2006/0215175 | A1 * | 9/2006 | Yacoubian | | G01N 21/9505 356/502 |
| 2007/0045250 | A1 * | 3/2007 | Moor | | B23K 26/211 219/121.64 |
| 2007/0068907 | A1 * | 3/2007 | Batzinger | | B23K 11/252 219/109 |
| 2007/0157730 | A1 * | 7/2007 | Ochiai | | G21C 17/003 73/627 |
| 2009/0090187 | A1 * | 4/2009 | Sano | | G01N 29/2418 73/655 |
| 2009/0249887 | A1 * | 10/2009 | Gysling | | G01H 5/00 73/861.18 |
| 2010/0049452 | A1 * | 2/2010 | Suginouchi | | G01S 15/325 702/56 |
| 2010/0155375 | A1 * | 6/2010 | Dietz | | B23K 26/046 219/121.18 |
| 2010/0199768 | A1 * | 8/2010 | Ochiai | | G21C 17/017 73/627 |
| 2010/0199769 | A1 * | 8/2010 | Ochiai | | G01B 17/02 73/627 |
| 2010/0208248 | A1 * | 8/2010 | Ochiai | | G21C 17/003 356/237.2 |
| 2010/0301038 | A1 * | 12/2010 | Weiss | | H05B 6/102 219/660 |
| 2010/0319456 | A1 * | 12/2010 | Ume | | G01N 29/46 73/622 |
| 2011/0023610 | A1 * | 2/2011 | Ume | | G01N 29/4481 73/622 |
| 2011/0284508 | A1 * | 11/2011 | Miura | | B23K 31/125 219/121.64 |
| 2012/0285936 | A1 * | 11/2012 | Urashima | | G01B 9/02091 219/121.63 |
| 2014/0150953 | A1 | 6/2014 | Sieben et al. | | |
| 2016/0067819 | A1 | 3/2016 | Kuki et al. | | |
| 2016/0202045 | A1 * | 7/2016 | Schonleber | | B23K 26/03 356/497 |
| 2016/0363434 | A1 * | 12/2016 | Takada | | G01B 9/02091 |
| 2017/0120337 | A1 * | 5/2017 | Kanko | | B23K 31/125 |
| 2017/0326669 | A1 * | 11/2017 | Moser | | B23K 26/21 |
| 2018/0178320 | A1 | 6/2018 | Webster | | |
| 2018/0264600 | A1 * | 9/2018 | Sugino | | B23K 31/125 |
| 2019/0143458 | A1 * | 5/2019 | Strebel | | B23K 26/28 219/121.64 |

FOREIGN PATENT DOCUMENTS

| | | |
|---|---|---|
| JP | 2006-266841 | 10/2006 |
| JP | 2007-057485 | 3/2007 |
| JP | 2008-102160 | 5/2008 |
| JP | 2008-151763 | 7/2008 |
| JP | 2015-085397 | 5/2015 |
| JP | 2016-055314 | 4/2016 |
| JP | 2016-538134 | 12/2016 |
| JP | 2018-501964 | 1/2018 |
| JP | 2018-153842 | 10/2018 |

* cited by examiner

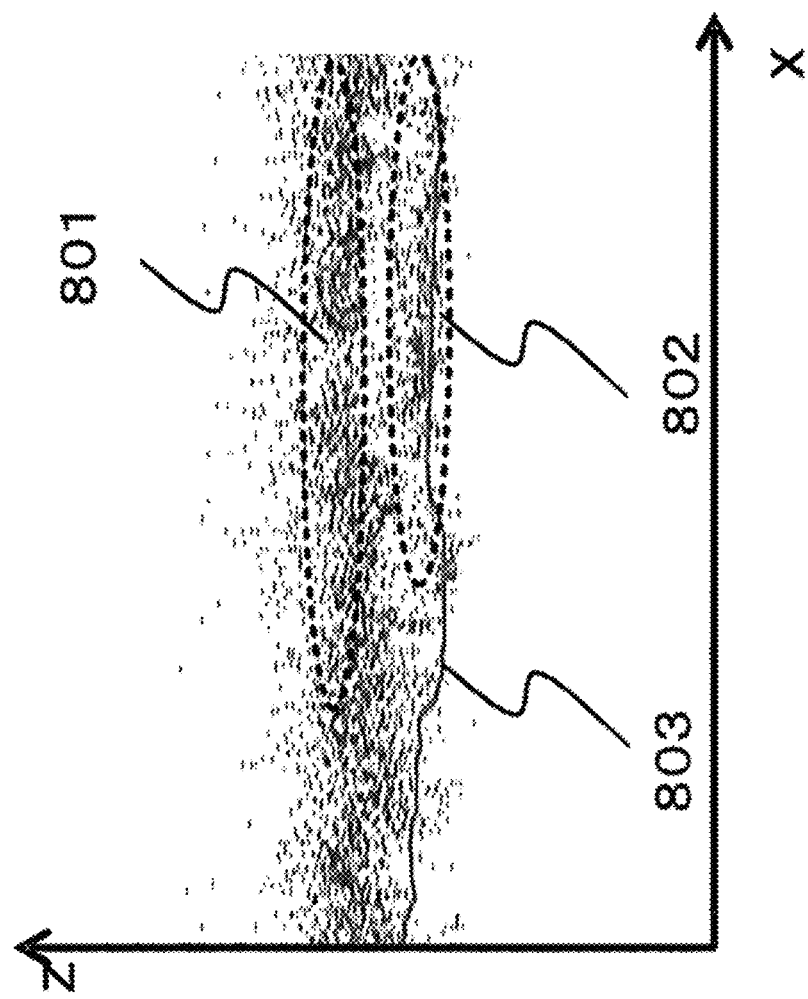

LASER WELDING APPARATUS AND LASER WELDING METHOD

TECHNICAL FIELD

The technical field relates to a laser welding apparatus and a laser welding method that perform welding by using a laser beam.

BACKGROUND

As a first laser welding apparatus of related art, there is an apparatus that evaluates a quality of a welding portion by using a beam emitted from a molten metal of the welding portion (for example, see JP-A-H3-207587).

An example of the first laser welding apparatus of the related art is shown in FIG. 15. A laser beam is continuously output from a laser oscillator 11 at a constant intensity. The laser beam is transmitted to a beam condensing optical system 13 via a laser beam transmitting optical system 12, and is condensed on a welding portion 2 of a welded material 1 by the beam condensing optical system 13. During welding, a molten metal of the welding portion 2 emits a beam. The beam emitted from the molten metal is condensed by the beam condensing optical system 13 and transmitted to an interference filter 15 via a monitor beam transmitting optical system 14. In the beam transmitted to the interference filter 15, a wavelength component of the beam emitted by the molten metal is selected by the interference filter 15. The beam having the wavelength component selected by the interference filter 15 is received by a photodiode 16. The photodiode 16 outputs a signal corresponding to a beam emission intensity of the received beam. The signal output from the photodiode 16 is input to a computer 19 via an amplifier 17 and an A/D converter 18. A correlation between a beam emission intensity of the molten metal and a penetration depth is stored in advance in the computer 19, and the computer 19 derives the penetration depth of the welding portion 2 by applying the input signal to the correlation. The computer 19 evaluates a quality of the welding portion 2 based on the derived penetration depth of the welding portion 2.

As a second laser welding apparatus of the related art, an apparatus that measures a depth of a keyhole generated during welding by using a technology called optical coherence tomography (OCT) which visualizes a structure inside a sample with an optical interferometer has been proposed (see JP-T-2016-538134).

Specifically, in the second laser welding apparatus of the related art, an optical system is configured such that a laser beam for the welding and a laser beam emitted from the optical interferometer are coaxial. In a welding portion, the laser beam of the optical interferometer is emitted to a bottom surface of a keyhole formed by a pressure during evaporation of a molten metal. A depth of the keyhole is calculated based on an optical path difference between a beam reflected by the keyhole (a measurement beam) and a reference beam. Since the keyhole is filled with the surrounding molten metal immediately after the formation, the depth of the keyhole is the same as a penetration depth of the welding portion. Accordingly, the penetration depth of the welding portion is measured.

SUMMARY

In the first laser welding apparatus of the related art, the correlation between the beam emission intensity of the molten metal and the penetration depth is used instead of directly measuring the penetration depth, thereby indirectly measuring the penetration depth of the welding portion 2 based on the beam emission intensity of the molten metal of the welding portion 2. However, the correlation may vary depending on factors such as a variation in a material of the welded material 1, a surrounding temperature, and a change in a formation state of the keyhole. Therefore, when the formation state of the keyhole during the welding is not constant, it is difficult to measure the penetration depth with sufficient accuracy.

In the second laser welding apparatus of the related art, the depth of the keyhole generated during the welding is directly measured. Therefore, when the formation state of the keyhole during the welding is not constant, it is difficult to measure the penetration depth with sufficient accuracy.

As described above, for the first laser welding apparatus and the second laser welding apparatus of the related art, since the measurement accuracy of the penetration depth is not sufficient, it is difficult to evaluate the quality of the welding portion with high accuracy.

The present disclosure provides a laser welding apparatus and a laser welding method that can accurately measure a penetration depth of a welding portion even when a formation state of a keyhole during welding is not constant.

To achieve the above object, the present disclosure provides a laser welding apparatus. The laser welding apparatus includes: a laser oscillator configured to emit a laser beam toward a welding portion of a welded material; an optical interferometer configured to generate an interference signal that indicates an intensity of an interference beam including a measurement beam reflected by the welding portion and a reference beam; and a derivation unit configured to generate, based on the interference signal, two-dimensional tomographic image data indicating a correlation among a distance in a proceeding direction of welding of the welding portion, a depth of the welding, and an intensity of the interference signal, to extract specified depth tomographic image data within a specified range from the two-dimensional tomographic image data, and to derive a depth for each distance based on the intensity of the interference signal in the specified depth tomographic image data.

A laser welding method according to an aspect of the present disclosure includes: emitting a laser beam toward a welding portion of a welded material; generating an interference signal that indicates an intensity of an interference beam including a measurement beam reflected by the welding portion and a reference beam; generating, based on the interference signal, two-dimensional tomographic image data that indicates a correlation among a distance in a proceeding direction of welding of the welding portion, a depth of the welding, and an intensity of the interference signal; extracting specified depth tomographic image data in which the depth of the welding is within a specified range from the two-dimensional tomographic image data; and deriving a depth for each distance based on the intensity of the interference signal for each distance in the specified depth tomographic image data.

A laser welding method according to an aspect of the present disclosure includes: emitting a laser beam toward a welding portion of a welded material; generating an interference signal that indicates an intensity of an interference beam including a measurement beam reflected by the welding portion and a reference beam; generating, based on the interference signal, point group data that indicates a correlation between a distance in a proceeding direction of welding of the welding portion and a depth of the welding;

extracting a high-density region in which a density of points in the point group data is high in a depth direction of the welding; and deriving a penetration depth of the welding portion based on a depth of the high-density region in which the depth of the welding is the second largest when a plurality of high-density regions exist.

According to the present disclosure, a penetration depth of a welding portion can be accurately measured even when a formation state of a keyhole during welding is not constant.

BRIEF DESCRIPTION OF THE DRAWINGS

FIG. 14A is a diagram showing a result of a penetration depth derived by a method of related art for deriving the penetration depth;

DESCRIPTION OF EMBODIMENTS

Hereinafter, embodiments of the present disclosure will be described with reference to the accompanying drawings.

First Embodiment

Figure 1:
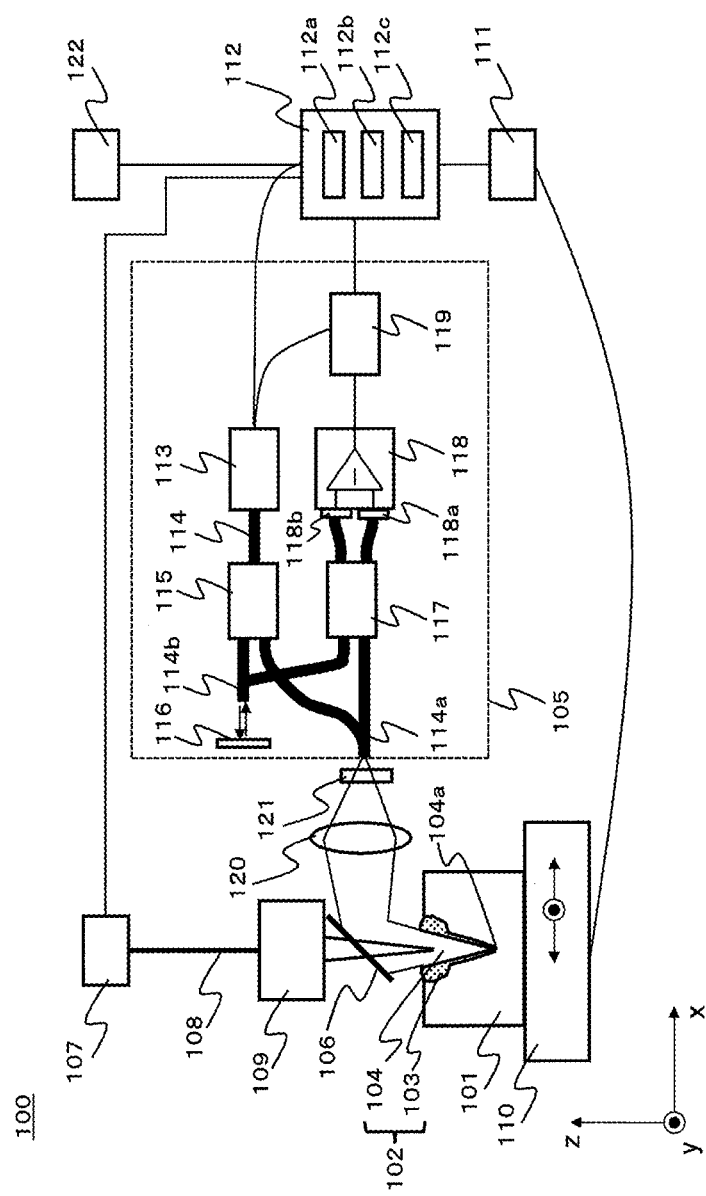
FIG. 1 is a diagram showing an outline of a laser welding apparatus according to a first embodiment.

FIG. 1 is a diagram showing an outline of a laser welding apparatus 100 according to the present embodiment. As shown in FIG. 1, in the laser welding apparatus 100, a welding portion 102 of a welded material 101 that extends in a horizontal direction (an x direction in FIG. 1) is welded. A laser beam for welding is emitted to an upper surface of the welded material 101 from a laser oscillator 107 in a vertical direction (a z direction). In the present description, the laser beam for the laser welding, which is oscillated by the laser oscillator 107, may be simply referred to as a laser beam. In the welded material 101, a portion irradiated with the laser beam is molten and a molten pool 103 is formed. A molten metal evaporates from the molten pool 103, and a keyhole 104 is formed by a pressure of steam generated during evaporation. Hereinafter, the molten pool 103 and the keyhole 104 are collectively referred to as the welding portion 102.

An optical interferometer 105 emits a laser beam having a wavelength different from that of the laser oscillator 107 to the welding portion 102, and measures a depth (a penetration depth) of the welding portion 102 by beam interference. The penetration depth means a distance between a deepest peak of a melted portion of the welded material 101 (a base material) and a surface to be welded.

The laser beam for the depth measurement emitted from the optical interferometer 105 is, by a beam splitter 106, coaxially superimposed on the laser beam from the laser oscillator 107 and emitted to inside of the keyhole 104. In the following description, in order to distinguish the beam emitted by the optical interferometer 105 from the laser beam for the welding oscillated by the laser oscillator 107, the beam emitted by the optical interferometer 105 is referred to as an object beam.

The object beam emitted to the welding portion 102 is reflected by a bottom portion 104a of the keyhole 104, and is incident on the optical interferometer 105 via the beam splitter 106. The optical interferometer 105 measures an optical path length of the object beam, and specifies a depth of the keyhole 104 from the measured optical path length as the penetration depth. Based on the specified penetration depth, the laser welding apparatus 100 determines a quality of the welding portion 102.

The above is the description of the outline of the laser welding apparatus 100. Next, each configuration of the laser welding apparatus 100 will be described.

<Components for Achieving Laser Welding Function>

First, a configuration that implements the laser welding function in the laser welding apparatus 100 will be described. The laser welding function is a function of performing welding on the welded material 101.

The laser oscillator 107 oscillates the laser beam for the welding. The laser beam oscillated from the laser oscillator 107 is condensed by a first beam condensing optical system 109 via a laser beam transmitting optical system 108. The laser beam condensed by the first beam condensing optical system 109 passes through the beam splitter 106 and is condensed on the welding portion 102. Accordingly, welding of the welded material 101 is performed. As the laser oscillator 107, for example, a direct diode laser is used.

A movement stage 110 is a base portion that moves the welded material 101. The welded material 101 is fixed to the movement stage 110. The movement stage 110 moves in accordance with a command from a control unit 112a of a computer 112 via a stage controller 111. A direction in which the movement stage 110 moves is a left-right direction shown in FIG. 1, that is, a direction along an x-axis shown in FIG. 1. While the laser beam is oscillated by the laser oscillator 107, the control unit 112a causes the movement stage 110 to move, thereby changing an irradiation position of the laser beam on the welded material 101 and performing laser welding in a desired range.

The control unit 112a controls each component of the laser welding apparatus 100. Specifically, the control unit 112a controls start or stop of the laser beam output by the laser oscillator 107, adjustment of an output intensity of the laser beam, the optical interferometer 105 to be described below, and the like.

<Components for Achieving Penetration Depth Measurement Function>

Next, a configuration that implements the penetration depth measurement function in the laser welding apparatus 100 will be described. The penetration depth measurement function is for measuring the penetration depth of the welding portion 102 (the keyhole 104) during welding in the welded material 101. The laser welding apparatus 100 measures the penetration depth of the welding portion 102 by using swept source optical coherence tomography (SS-OCT) technology that uses the optical interferometer 105.

Figure 2:
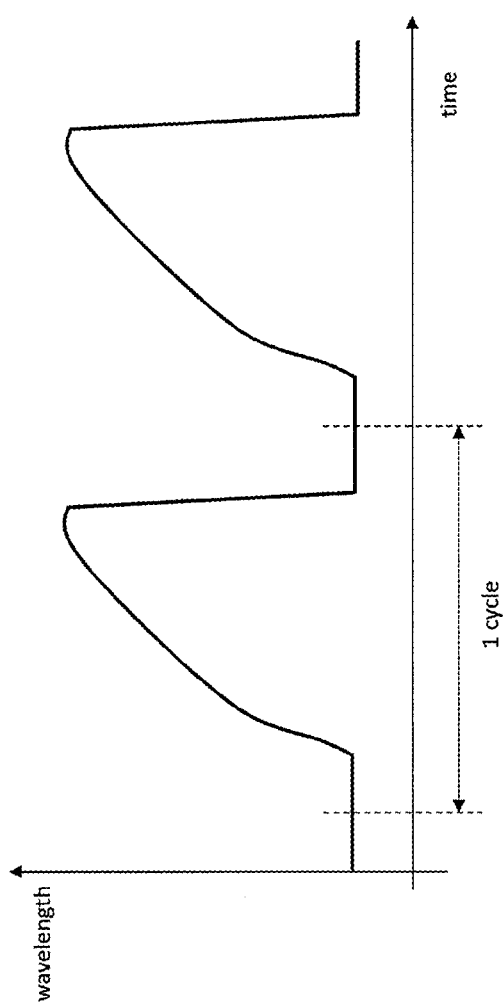
FIG. 2 is a diagram showing an example of a change with time in a center wavelength of an object beam emitted by a swept beam source according to the first embodiment.

A swept beam source 113 continuously emits the object beam having a wavelength width shorter than that of the laser beam for the welding under the control of the control unit 112a. The control unit 112a periodically changes a center wavelength of the object beam emitted by the swept beam source 113 as shown in FIG. 2. FIG. 2 is a diagram showing an example of a change with time in the center wavelength of the object beam emitted by the swept beam source 113. In FIG. 2, a vertical axis corresponds to a wavelength of the object beam and a horizontal axis corresponds to time. In this manner, scanning performed by periodically changing the center wavelength of the object beam is referred to as sweeping.

As shown in FIG. 1, the object beam emitted from the swept beam source 113 passes through an optical fiber system 114 and is incident on a first fiber coupler 115. The first fiber coupler 115 splits the incident object beam into two beams. The two split object beams are hereinafter referred to as a measurement beam and a reference beam. The measurement beam is a beam among the object beam that is emitted to the welding portion 102 to be measured. The reference beam is a beam among the object beam that is emitted to a reference mirror 116 that is a separately provided reference surface. The first fiber coupler 115 causes the split measurement beam to be incident on a first optical fiber system 114a and the split reference beam to be incident on a second optical fiber system 114b.

The measurement beam emitted from the first optical fiber system 114a of the optical interferometer 105 is incident on the beam splitter 106 via an interference filter 121 and a second beam condensing optical system 120. The interference filter 121 only transmits a wavelength of the measurement beam. The interference filter 121 is provided to prevent the laser beam reflected by the welding portion 102 and a beam emitted due to the welding of the welding portion 102 from being incident on the first optical fiber system 114a. The second beam condensing optical system 120 condenses the measurement beam emitted from the first optical fiber system 114a of the optical interferometer 105 to the welding portion 102 via the beam splitter 106. The second beam condensing optical system 120 causes the measurement beam reflected from the welding portion 102 to be incident on the first optical fiber system 114a again via the beam splitter 106.

The beam splitter 106 transmits the laser beam from the laser oscillator 107 and reflects the measurement beam from the optical interferometer 105, thereby combining the laser beam and the measurement beam into a coaxial beam flux. When the laser beam and the measurement beam that are combined into the coaxial beam flux by the beam splitter 106 are emitted to the welding portion 102, the penetration depth of the welding portion 102 is measured simultaneously with the laser welding. The beam splitter 106 is, for example, a dichroic mirror. A wavelength to be transmitted and a wavelength to be reflected are set in advance in the beam splitter 106 so as to transmit the laser beam from the laser oscillator 107 and reflect the measurement beam from the optical interferometer 105.

A wavelength difference between the laser beam and the measurement beam is preferably 100 nm or more so that the beam splitter 106 can transmit the laser beam and reflect the measurement beam in a suitable manner. In the first embodiment, a wavelength of the laser beam oscillated by the laser oscillator 107 is 975 nm, and a wavelength of a physical beam (the measurement beam) emitted by the swept beam source 113 is 1270 nm to 1370 nm.

As described above, the measurement beam from the optical interferometer 105 is emitted to the welding portion 102. A part of the measurement beam emitted to the welding portion 102 is reflected by the welding portion 102. The measurement beam reflected by the welding portion 102 is incident on the optical interferometer 105 via the beam splitter 106, the second beam condensing optical system 120, and the interference filter 121. The measurement beam incident on the optical interferometer 105 passes through the first optical fiber system 114a and is incident on a second fiber coupler 117. At this time, a length of an optical path through which the measurement beam passes since being emitted from the first fiber coupler 115 until being incident on the second fiber coupler 117 is regarded as the length of the optical path of the measurement beam.

On the other hand, the reference beam split by the first fiber coupler 115 passes through the second optical fiber system 114b and is emitted to the reference mirror 116. The reference beam emitted to the reference mirror 116 is reflected by the reference mirror 116, and then is incident on the second optical fiber system 114b. The reference beam incident on the second optical fiber system 114b is transmitted through the second optical fiber system 114b and is incident on the second fiber coupler 117. At this time, a length of an optical path through which the reference beam passes since being emitted from the first fiber coupler 115 until being incident on the second fiber coupler 117 is regarded as the length of the optical path of the reference beam. The length of the optical path of the reference beam is preferably measured in advance as a reference value.

The second fiber coupler 117 splits the measurement beam incident from the first optical fiber system 114a and the reference beam incident from the second optical fiber system 114b and causes the split measurement beam and the split reference beam to be respectively incident on a first input 118a and a second input 118b of a differential detector 118. Specifically, the second fiber coupler 117 causes 50% of the measurement beam incident from the first optical fiber system 114a to be incident on the first input 118a, and causes the remaining 50% of the measurement beam to be incident on the second input 118b.

Similarly, the second fiber coupler 117 causes 50% of the reference beam incident from the second optical fiber system 114b to be incident on the second input 118b, and causes the remaining 50% of the reference beam to be incident on the first input 118a. At this time, the second fiber coupler 117 combines the split reference beam and the split measurement beam into one beam flux and forms interference beams. The two interference beams combined by the second fiber coupler 117 are respectively incident on the first input 118a and the second input 118b.

The differential detector 118 takes a difference between the interference beams respectively input from the first input 118a and the second input 118b, removes an influence of a noise included in the interference beams, and then generates an interference signal that is an electrical signal based on intensities of the interference beams. The differential detector 118 outputs the interference signal to an A/D converter 119.

A trigger signal synchronized with a repetition frequency of sweeping in the swept beam source 113 is input from the swept beam source 113 to the A/D converter 119. The A/D converter 119 samples the interference signal output from the differential detector 118 in synchronization with a period of the sweeping based on the input trigger output, and converts the sampled reference signal into a digital signal. The A/D converter 119 outputs the interference signal converted into the digital signal to the computer 112.

The computer 112 includes the above-described control unit 112a and a derivation unit 112b that derives the penetration depth of the welding portion 102 based on the input interference signal. Interference in accordance with a difference between the length of the optical path of the measurement beam and the length of the optical path of the reference beam is generated in the interference beams. The derivation unit 112b derives the penetration depth of the welding portion 102 based on the interference of the interference beams. The derivation of the penetration depth in the derivation unit 112b will be described in detail below. The penetration depth derived by the derivation unit 112b is displayed on a display unit 122 or the like as a penetration depth measured by the laser welding apparatus 100.

The computer 112 includes an evaluation unit 112c that evaluates a quality of the welding portion 102 based on the measured penetration depth. In the laser welding apparatus 100 in the first embodiment, information on a desired range of the penetration depth is stored in advance in a storage unit (not shown) or the like. The desired range of the penetration depth means a range of a penetration depth of the welded material 101 determined as a non-defective product after the welding. Hereinafter, the desired range of the penetration depth is referred to as a non-defective product depth range. The evaluation unit 112c determines whether the penetration depth is within the non-defective product depth range, thereby evaluating the quality of the welding portion 102. An evaluation result is displayed, for example, on the display unit 122. Although both the penetration depth and the evaluation result are displayed on the display unit 122, only one of the penetration depth and the evaluation result may be displayed.

As described above, the laser welding apparatus 100 includes a configuration having the laser welding function and has the penetration depth measurement function. Accordingly, the laser welding apparatus 100 can sequentially execute the laser welding and measure the penetration depth of the welded welding portion 102.

<Operation Example of Laser Welding Apparatus>

Figure 3:
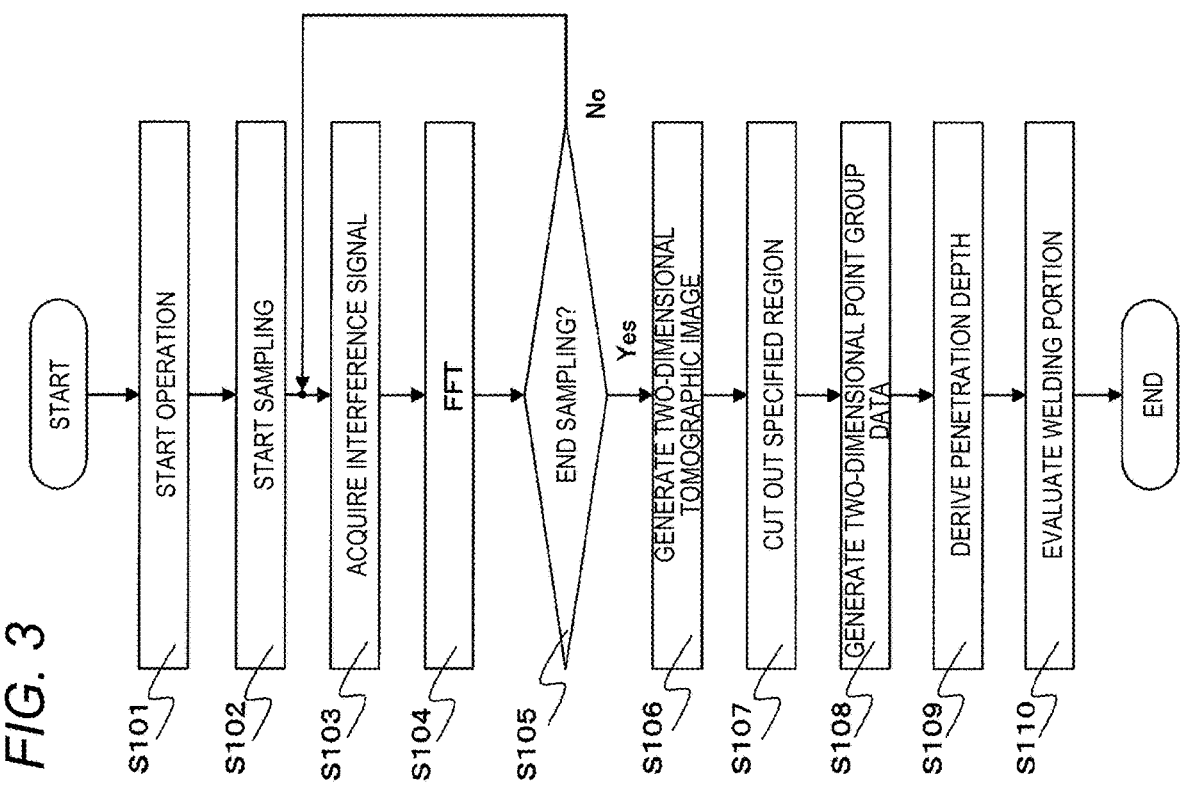
FIG. 3 is a flowchart showing an operation example of the laser welding apparatus according to the first embodiment.

Next, the operation example of the laser welding apparatus 100 in the first embodiment will be described in detail. FIG. 3 is a flowchart showing the operation example of the laser welding apparatus 100.

In step S101, operation of the laser welding apparatus 100 is started. Specifically, the control unit 112a causes the stage controller 111 to start moving the movement stage 110, and causes the laser oscillator 107 to start outputting the laser beam. Further, the control unit 112a causes the swept beam source 113 of the optical interferometer 105 to start outputting the object beam.

In step S102, the A/D converter 119 of the optical interferometer 105 starts sampling the interference signal. In step S103, the derivation unit 112b acquires the interference signal converted into the digital signal as the sampling result from the A/D converter.

In step S104, the derivation unit 112b executes a fast Fourier transformation (FFT) on the acquired interference signal and stores a result in the storage unit (not shown) (for example, a storage region of the computer 112).

In step S105, the derivation unit 112b determines whether the sampling by the A/D converter 119 is to be ended. When the sampling is not to be ended (No in step S105), the processing proceeds to step S104, and when the sampling is to be ended (Yes in step S105), the processing proceeds to step S106. When the sampling is to be ended, the control unit 112a causes the laser oscillator 107 to end the output of the laser beam, and causes the stage controller 111 to end the movement of the movement stage 110. Accordingly, the laser welding on the welded material 101 is ended. Whether the sampling is to be ended may be determined based on, for example, operation of a user on an operation unit (not shown) or the like.

In step S106, the derivation unit 112b reads an execution result of the FFT for the interference signal and generates two-dimensional tomographic image data based on the result.

Figure 4A:
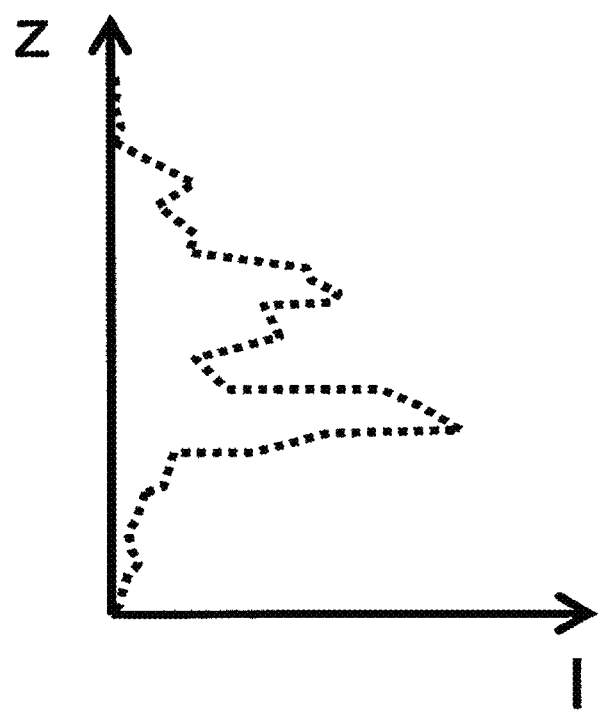
FIG. 4A is a diagram showing an example of A-scan data according to the first embodiment.

FIG. 4A is a diagram showing a correlation between a distance in a depth direction of the welding (hereinafter, simply referred to as a depth) and an intensity I of the interference signal at one point (a measurement point) in a welding direction of the welded material 101. The welding direction is a proceeding direction of the laser welding and corresponds to an x-axis direction in FIG. 1. The depth direction corresponds to a z-axis direction shown in FIG. 1. An upward direction corresponds to an upper side of the welding portion 102, that is, a side on which the depth is small. A downward direction corresponds to a lower side of the welding portion 102, that is, a side on which the depth is large. In this manner, acquiring information on the depth of the welding at the measurement point is generally referred to as A-scan, and data acquired by the A-scan is referred to as A-scan data.

Figure 4B:
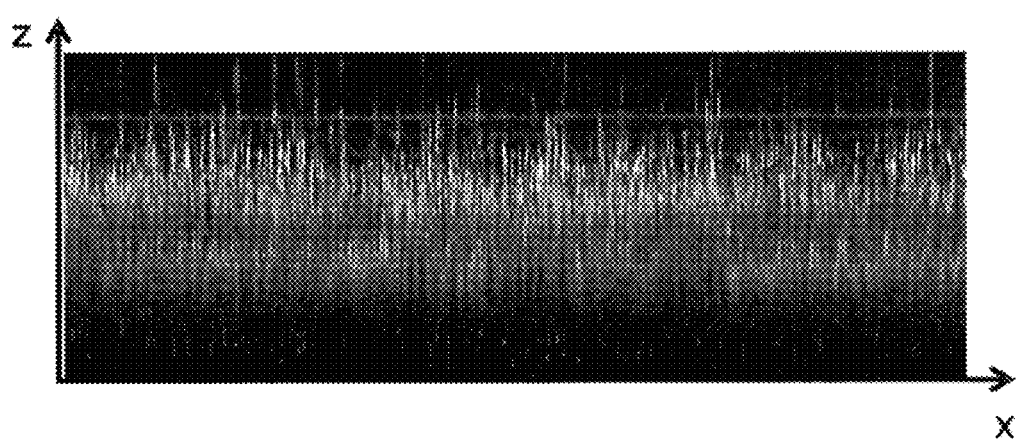
FIG. 4B is a diagram showing an example of B-scan data according to the first embodiment.

The A-scan is performed along the proceeding direction of the laser welding, whereby two-dimensional tomographic image data on the welding direction, the depth direction, and the intensity of the interference signal can be acquired. The two-dimensional tomographic image data is generally referred to as B-scan data. FIG. 4B is a diagram showing an example of the B-scan data. In FIG. 4B, a vertical axis z indicates the depth direction (corresponding to the z-axis direction shown in FIG. 1), a horizontal axis x indicates the welding direction (corresponding to the x-axis direction shown in FIG. 1), and light and shade on the image indicates the intensity I of the interference signal.

Figure 4C:
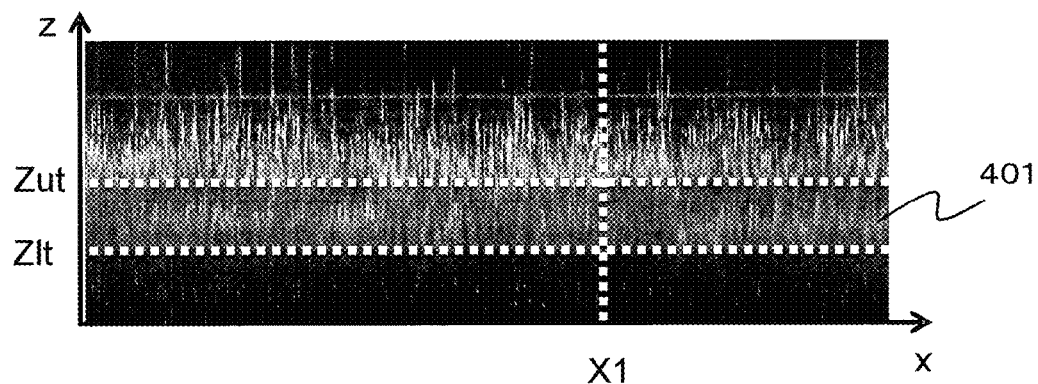
FIG. 4C is a diagram showing an example of a specified depth range according to the first embodiment.

In step S107, the derivation unit 112b cuts out two-dimensional tomographic image data within a specified depth range set in advance from the two-dimensional tomographic image data created in step S106. The specified depth range is defined by an upper limit set in advance for a cut-out position (an upper limit depth) and a lower limit set in advance for the cut-out position (a lower limit depth). FIG. 4C is a diagram showing an example of the specified depth range. FIG. 4C shows an example of an upper limit depth Zut and a lower limit depth Zlt for the specified depth range. The two-dimensional tomographic image data cut out within the specified depth range is hereinafter referred to as specified depth tomographic image data 401. In the example shown in FIG. 4C, the specified depth tomographic image data 401 is two-dimensional tomographic image data within a range having a lower limit depth equal to or larger than the lower limit depth Zlt and an upper limit depth equal to or smaller than the upper limit depth Zut. The upper limit depth Zut and the lower limit depth Zlt of the specified depth range may be set based on the above-described non-defective product depth range.

A method for setting the non-defective product depth range may be, for example, as follows. That is, the laser welding is performed in advance on a plurality of materials to be welded, and information on penetration depths of welding portions determined to be non-defective products among welding portions of the plurality of welded materials is collected. In the first embodiment, the information on the penetration depths of the plurality of welding portions determined to be the non-defective products is an average value Ave (a reference value) and a standard deviation $\sigma$. An upper limit value and a lower limit value of the non-defective product depth range are set by an optional method using the average value Ave and the standard deviation $\sigma$. For example, the upper limit value is set to Ave+3$\sigma$, and the lower limit value is set to Ave−3$\sigma$. That is, this specific depth range is set as a first range.

Based on the non-defective product depth range, the above-described specified depth range is preferably set to be wider than the non-defective product depth range so as to have a margin. Specifically, when the non-defective product depth range has the upper limit value and the lower limit value, the upper limit depth Zut of the specified depth range is set to, for example, Ave+4$\sigma$, and the lower limit depth Zlt of the specified depth range is set to, for example, Ave−4$\sigma$. That is, this specific depth range is set as a second range wider than the first range. The derivation unit 112b cuts out the two-dimensional tomographic image data within the specified depth range set in this manner.

In step S108, the derivation unit 112b specifies the depth of the welding at the measurement point based on the specified depth tomographic image data 401 cut out in step S107, and generates two-dimensional point group data based on the specified depth of the welding. The two-dimensional point group data generated by the derivation unit 112b is collective data on a set of points indicating a correlation between a certain measurement point and a depth of welding at the measurement point. The depth of the welding at the measurement point in the welding direction is specified, for example, as the intensity of the interference signal at the measurement point, that is, as a distance at which an intensity of reflection of the measurement beam by the welding portion 102 is maximized.

Figure 4D:
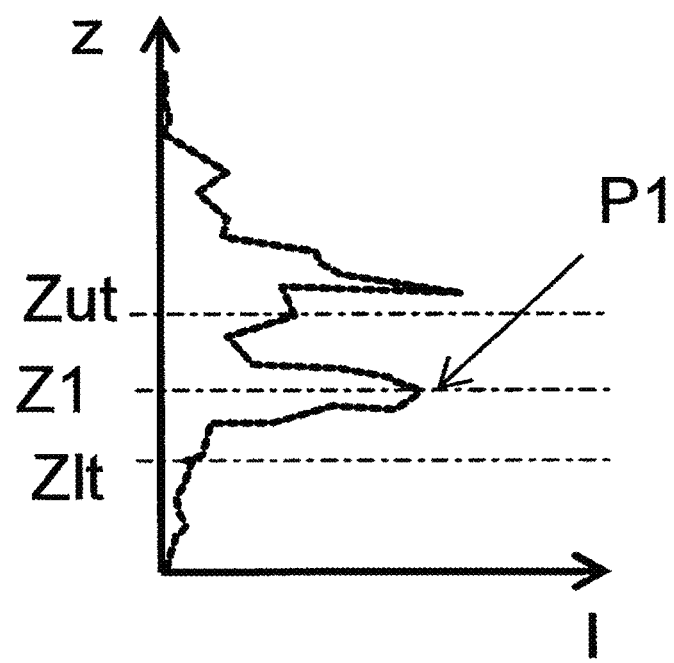
FIG. 4D is a diagram showing a method for specifying a depth according to the first embodiment.

FIG. 4D is a diagram showing a method for specifying the depth. FIG. 4D shows the A-scan data at a certain measurement point X1 in FIG. 4C, that is, a correlation between the depth and the intensity of the interference signal. In FIG. 4D, P1 is a point where the intensity of the interference signal is the strongest between the upper limit depth Zut and the lower limit depth Zlt.

Therefore, in the example shown in FIG. 4D, a depth Z1 corresponding to the point P1 is a depth of welding at the measurement point X1 shown in FIG. 4C.

Figure 5A:
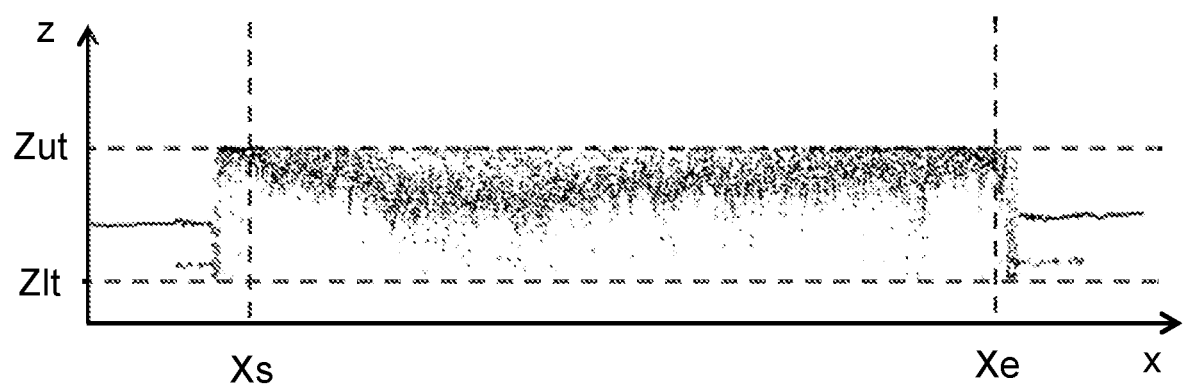
FIG. 5A is a diagram showing an example of two-dimensional point group data according to the first embodiment.
Figure 5B:
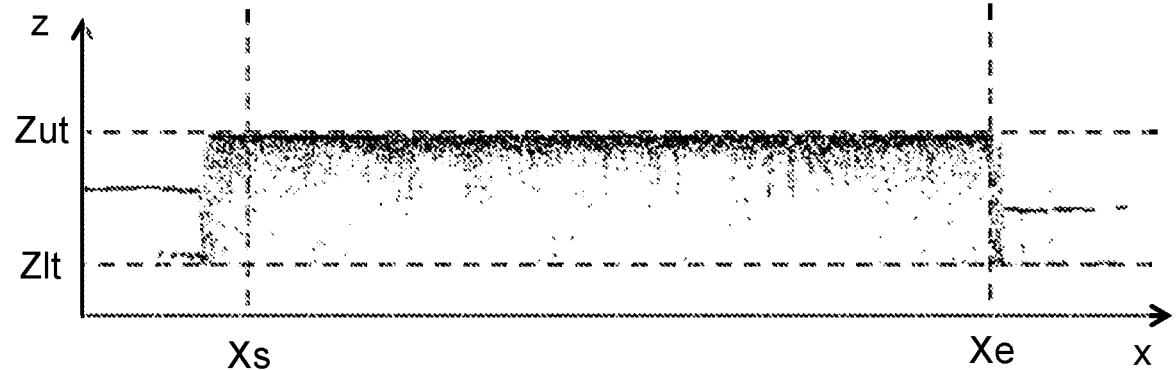
FIG. 5B is a diagram showing an example of two-dimensional point group data of related art.

The two-dimensional point group data is generated by plotting, on a two-dimensional plane, points indicating a correlation between the position of the measurement point in the welding direction and the depth of the welding specified for each measurement point as described above. FIGS. 5A and 5B are diagrams showing examples of the two-dimensional point group data generated as described above. In FIGS. 5A and 5B, a vertical axis z indicates the depth of the welding, and a horizontal axis x indicates the welding direction, separately.

FIG. 5A shows the example of the two-dimensional point group data created using a welding portion having a depth within the non-defective product depth range (determined to be a non-defective product). On the other hand, FIG. 5B shows the example of the two-dimensional point group data created using a welding portion having a depth not within the non-defective product depth range (determined to be a defective product). Specifically, the two-dimensional point group data shown in FIG. 5B is created using the welding portion where welding is performed at a penetration depth smaller than the non-defective product depth range. A start point Xs in FIGS. 5A and 5B indicates a start position in the welding direction at which the depth of the welding is measured in the laser welding apparatus 100. An end point Xe indicates an end position in the welding direction at which the depth of the welding is measured in the laser welding apparatus 100.

The two-dimensional point group data generated in the first embodiment is generated using the above-described specified depth tomographic image data cut out within the specified depth range in step S107. Therefore, as shown in FIGS. 5A and 5B, each point of the two-dimensional point group data is within a range having a lower limit depth equal to or larger than the lower limit depth Zlt and an upper limit depth equal to or smaller than the upper limit depth Zut. The two-dimensional point group data of FIG. 5A, which is non-defective product data, is scattered and distributed in the range having the lower limit depth equal to or larger than the lower limit depth Zlt and the upper limit depth equal to or smaller than the upper limit depth Zut, while each point of the two-dimensional point group data in FIG. 5B, which is defective product data, is concentrated near the upper limit depth Zut which has a small depth.

Figure 6A:
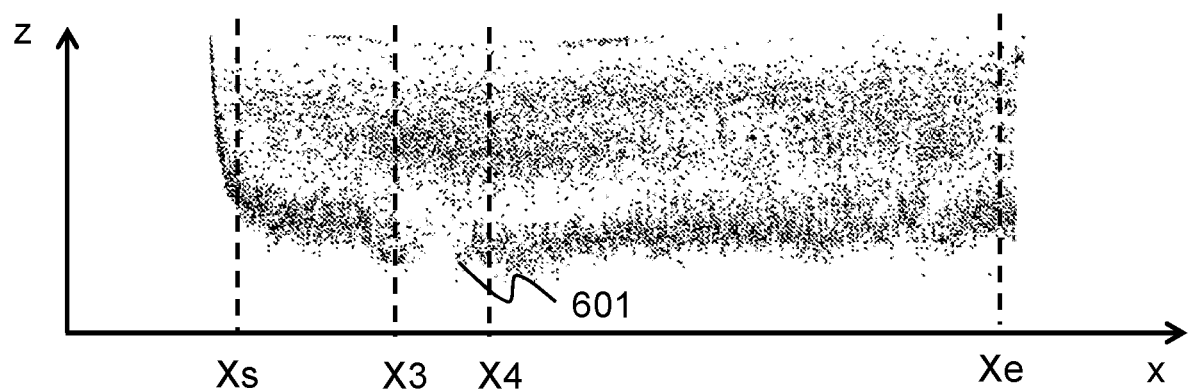
FIG. 6A is a diagram showing an example of the two-dimensional point group data of the related art when specified depth tomographic image data is not cut out.
Figure 6B:
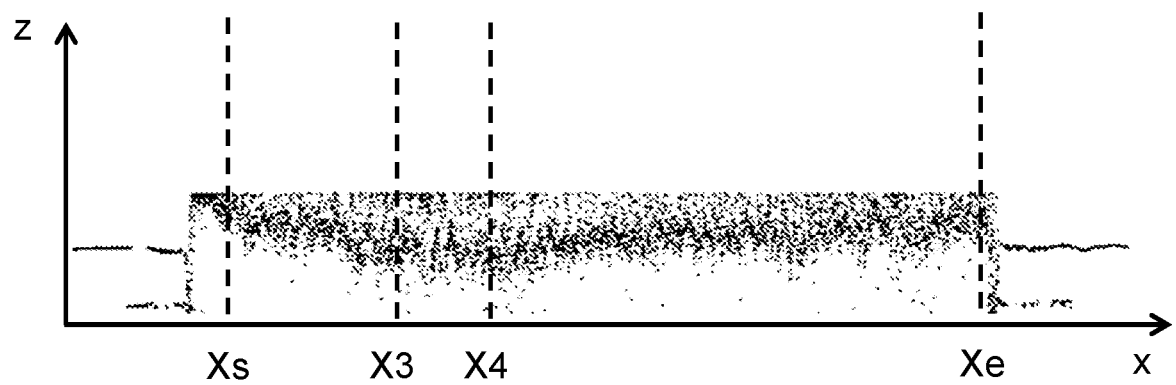
FIG. 6B is a diagram showing an example of the two-dimensional point group data when the specified depth tomographic image data is cut out according to the first embodiment.

FIGS. 6A and 6B are diagrams showing differences between a case where the specified depth tomographic image data 401 is not cut out in the two-dimensional point group data (the related art) and the case where the specified depth tomographic image data 401 is cut out in the two-dimensional point group data (the present embodiment). FIG. 6A shows an example of the two-dimensional point group data when the specified depth tomographic image data 401 is not cut out, and FIG. 6B shows an example of the two-dimensional point group data when the specified depth tomographic image data 401 is cut out. In FIGS. 6A and 6B, the two-dimensional tomographic image data that is a source of the two-dimensional point group data is the same.

FIG. 6A shows the example of the two-dimensional point group data generated without cutting out the specified depth tomographic image data in step S107 by using the two-dimensional tomographic image data generated in step S106 of the flowchart of FIG. 3. For this reason, in FIG. 6A, the two-dimensional point group data is generated in an entire region in the depth direction. In general, in the two-dimensional point group data, a distribution of points that exist at a deepest position corresponds to an interference signal derived from a bottom surface of the keyhole 104. Therefore, the penetration depth of the welding is highly correlated with a distribution of points located near a lower limit value in a depth direction of the two-dimensional point group data. As shown in FIG. 6A, in the two-dimensional point group data generated without cutting out the specified depth tomographic image data, a deficiency 601 may be generated (a region from X3 to X4 in the welding direction shown in FIG. 6A) in the distribution of the points located near the lower limit value in the depth direction. Such a phenomenon is considered to be generated as a result of a variation in the interference signal generated by the optical interferometer 105 when a formation state of the keyhole 104 during the welding is not constant.

As shown in FIG. 6A, when the deficiency 601 exists in the distribution of the two-dimensional point group data, it is difficult to correctly calculate the penetration depth of the welding portion 102, and it is difficult to accurately determine the quality of the penetration depth.

On the other hand, as shown in FIG. 6B, in the two-dimensional point group data generated based on the specified depth tomographic image data cut out within a specified depth range, no deficiency is generated in the region from X3 to X4 in the welding direction. In this manner, the two-dimensional point group data is generated using the specified depth tomographic image data in the first embodiment, whereby suitable two-dimensional point group data can be generated even when the formation state of the keyhole 104 during the welding is not constant.

Referring back to FIG. 3. In step S109, the derivation unit 112b derives the penetration depth based on the two-dimensional point group data generated in step S108. In step S110, the evaluation unit 112c evaluates the welding portion 102 based on the derived penetration depth.

As described above, according to the first embodiment of the present disclosure, even when a variation is generated in the interference signal generated by the optical interferometer when the formation state of the keyhole 104 during the welding is not constant, the penetration depth during the laser welding can be accurately measured. Therefore, the quality of the welding portion can be evaluated based on the correct penetration depth, and the quality of the welding portion can be evaluated with high accuracy.

Second Embodiment

As described above, in the first embodiment, the derivation unit 112b cuts out the tomographic image data within the specified depth range from the two-dimensional tomographic image data, and generates the two-dimensional point group data based thereon. At this time, in the first embodiment, the upper limit depth and the lower limit depth of the specified depth range are constant values in the welding direction.

The laser welding apparatus is the same as that of the first embodiment. Differences from the first embodiment will be described.

Depending on welding, a desired penetration depth may not be constant in a welding direction, and the desired penetration depth may vary depending on a position in the welding direction. Specifically, a case where a welding speed is changed during the welding, a case where a laser output of the laser oscillator is changed during the welding, a case where the welded material is welded along a curve, a case where portions having different thermal diffusion states of the welded material are continuously welded, and the like are exemplified. In the second embodiment, in order to deal with such cases, a case where the upper limit depth and the lower limit depth of the specified depth range are varied depending on the distance in the welding direction will be described. In the following description, the same components as those of the first embodiment are denoted by the same reference numerals, and description thereof is omitted.

Figure 7:
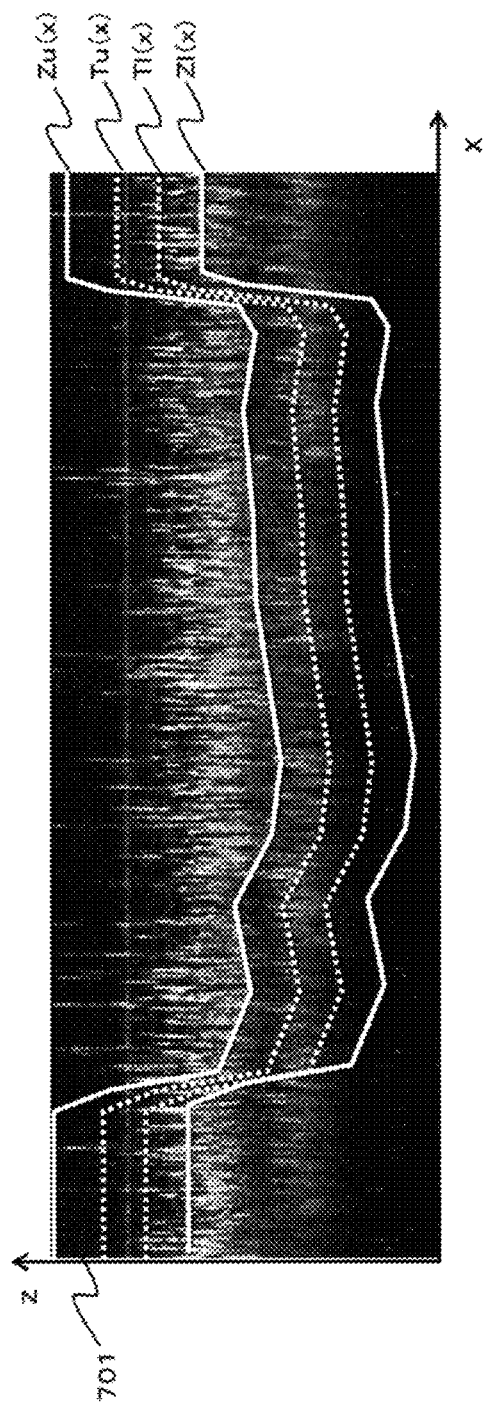
FIG. 7 is a diagram showing an example of a specified depth range according to a second embodiment.

FIG. 7 is a diagram showing an example of the specified depth range cut out in the second embodiment. In FIG. 7, a vertical axis z indicates the depth direction of the welding (corresponding to the z direction in FIG. 1), and a horizontal axis x indicates the welding direction (corresponding to the x direction in FIG. 1). Light and shade on the image indicates the intensity of the interference signal.

As shown in FIG. 7, a region surrounded by a variation upper limit depth and a variation lower limit depth is within a specified depth range 701. Since a value of the variation upper limit depth and a value of the variation lower limit depth vary depending on the welding direction (the x direction), the values are expressed as a function of x in an x-z plane shown in FIG. 7. Hereinafter, the variation upper limit depth is denoted by Zu (x) and the variation lower limit depth is denoted by Zl (x).

A method for setting the specified depth range is set based on the upper limit value and the lower limit value of the non-defective product depth range as in the first embodiment. However, in the second embodiment, since the non-defective product depth range also varies depending on the position in the welding direction, the specified depth range is specifically set as follows.

That is, laser welding is performed in advance on a plurality of welded materials, and information on penetration depths of welding portions determined to be non-defective products among welding portions of the plurality of materials to be welded is collected. In the second embodiment, the information on the penetration depths of the plurality of welding portions determined to be the non-defective products is an average value Ave (x) and a standard deviation σ (x). In the second embodiment, the average value Ave (x) and the standard deviation σ (x) of such penetration depths are expressed as functions of the distance x in the welding direction.

The upper limit value and the lower limit value of the non-defective product depth range are set by an optional method using the average value Ave (x) and the standard deviation σ (x). For example, the non-defective product depth range is set to be equal to or larger than a lower limit value Tl (x) shown in the following equation (2) and equal to or smaller than an upper limit value Tu (x) shown in the following equation (1).

$$Tu(x)=Ave(x)+3\sigma(x) \quad (1)$$

$$Tl(x)=Ave(x)-3\sigma(x) \quad (2)$$

In the second embodiment, similar to the first embodiment, the specified depth range is also set to be wider than the non-defective product depth range. Specifically, when an optional offset amount in the depth direction is set as Zoff, the upper limit value (the value of the variation upper limit depth) Zu (x) and the lower limit value (the value of the variation lower limit depth) Zl (x) of the specified depth range are expressed by the following equations (3) and (4).

$$Zu(x)=Tu(x)+Zoff \quad (3)$$

$$Zl(x)=Tl(x)-Zoff \quad (4)$$

Since the curves Tu (x), Tl (x), Zu (x), Zl (x) in the x-z plane are acquired by shifting the average value Ave (x) of the penetration depths in a case of non-defective products in the depth direction, all shapes of the curves are the same.

In this manner, in the second embodiment, the derivation unit 112b changes the specified depth range to be cut out in accordance with the position in the welding direction when image data within the specified depth range is cut out from two-dimensional tomographic image data. With such a configuration, the following effects can be acquired.

Figure 8A:
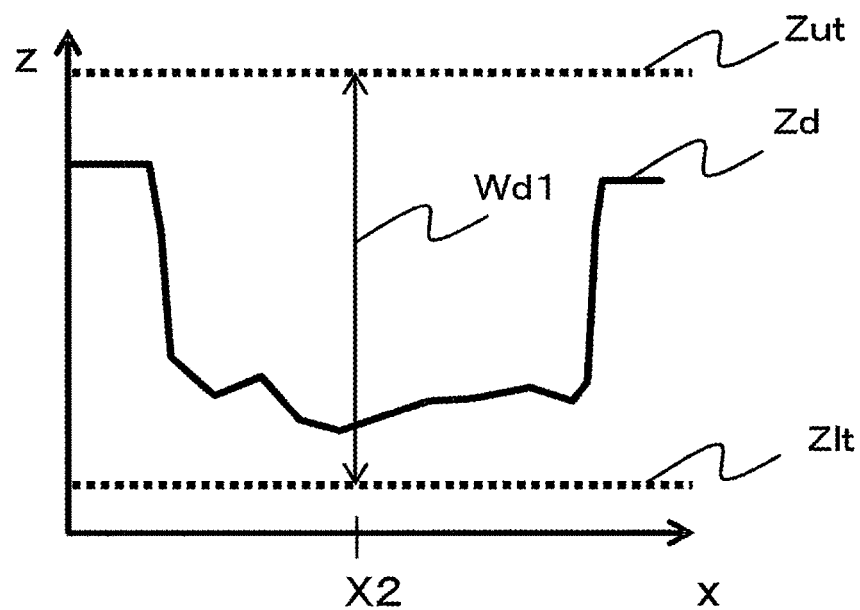
FIG. 8A is a diagram showing an example of a tomographic image when the specified depth range is constant regardless of a distance in a welding direction.
Figure 8B:
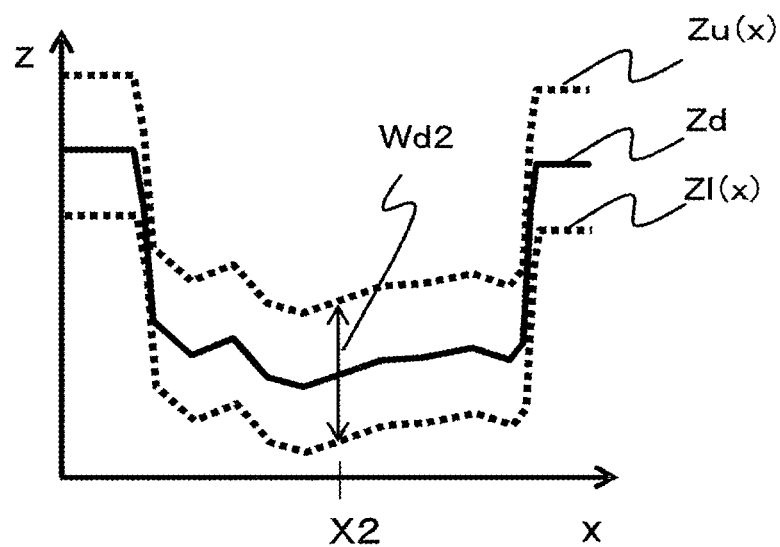
FIG. 8B is a diagram showing an example of the tomographic image when the specified depth range varies depending on the distance in the welding direction according to the second embodiment.

FIGS. 8A and 8B are diagrams showing effects of the second embodiment. FIG. 8A shows a specified depth range that is constant regardless of the distance x in the welding direction when a desired depth Zd varies depending on the distance x in the welding direction. In FIG. 8A, the specified depth range having an upper limit depth Zut and a lower limit depth Zlt is set to include all the depths Zd that vary depending on the distance x in the welding direction.

On the other hand, FIG. 8B shows a specified depth range in the second embodiment. In FIG. 8B, a variation upper limit depth Zu (x) and a variation lower limit depth Zl (x) that have the same shape as the depth Zd which varies depending on the distance x in the welding direction in the x-z plane are set.

Comparing FIGS. 8A and 8B with each other, a width in the depth direction of the specified depth range at a certain distance X2 is smaller in FIG. 8B (a width Wd2) than in FIG. 8A (a width Wd1). This is because that in the second embodiment shown in FIG. 8B, the width in the depth direction of the specified depth range is constant regardless of the distance x in the welding direction, while in the example shown in FIG. 8A, the specified depth range is set to include the desired depths Zd at all the distances x.

That is, in the second embodiment, only a necessary minimum range in the vicinity of the desired penetration depth Zd can be set as the specified depth range. Accordingly, in the second embodiment, when the derivation unit 112b cuts out the specified depth tomographic image data from the two-dimensional tomographic image data, it is possible to cut out only the necessary minimum range corresponding to the desired penetration depth. Accordingly, for example, the penetration depth can be accurately measured even when a formation state of the keyhole during the welding is not constant.

As described above, according to the laser welding apparatus 100 in the second embodiment, when the desired penetration depth varies depending on the position in the welding direction, the penetration depth of the welding portion can be accurately measured even when the formation state of the keyhole during the welding is not constant. Therefore, according to the laser welding apparatus 100 in the second embodiment, a quality of the welding portion can be evaluated based on the correct penetration depth, and the quality of the welding portion can be evaluated with high accuracy.

Modification

Although various embodiments have been described above with reference to the accompanying drawings, the present embodiment is not limited to such examples. It is apparent to those skilled in the art that various changes or modifications can be conceived within the scope of the claims, and it should be understood that these changes or modifications also naturally belong to the technical scope of the present embodiment. Constituent elements in the above-described embodiments may be optionally combined within a range not departing from the spirit of the present disclosure.

In the above-described embodiments, the movement stage 110 that moves the welded material 101 on the irradiated side is adopted as a unit that moves the irradiation position of the laser beam for welding. The present embodiment is not limited thereto. The first beam condensing optical system 109 and the like that is the side from which a laser beam for welding is emitted may be moved. Examples of a unit that moves the first beam condensing optical system 109 and the like include, for example, a galvano scanner and a robot arm.

In the above-described embodiments, the penetration depth is measured using a principle of the SS-OCT in which the scanning is performed by changing the frequency in accordance with laser oscillation. An OCT includes a time domain OCT (TD-OCT) that measures a distance of an object by moving a reference mirror. However, when the TD-OCT is applied to the present embodiment, it is necessary to move the reference mirror at a very high speed in accordance with the laser oscillation, which is difficult to implement. Therefore, it is preferable to adopt the SS-OCT instead of the TD-OCT as a penetration depth measurement mechanism in the present embodiment.

In the above-described embodiments, it is assumed that welding conditions (the intensity of the laser beam for the welding, a moving speed of the welded material 101, and the like) are not changed after the welding is started. However, for example, before the penetration depth measured by the derivation unit 112b is outside the desired depth range, the control unit 112a may change the welding conditions to prevent occurrence of a defective product in advance. In this case, a range of the penetration depth for changing the welding conditions (a welding condition holding range) is newly set. When detecting that the measured penetration depth deviates from the welding condition holding range before deviating from the non-defective product depth range, the derivation unit 112b causes the control unit 112a to change the welding conditions. The control unit 112a may change the welding conditions by adjusting the output intensity of the laser beam and the moving speed of the welded material 101.

In the above-described embodiments, it is assumed that a spot diameter of the measurement beam of the optical interferometer 105 on the surface of the welded material 101 is smaller than a spot diameter of the laser beam of the laser oscillator 107 on the surface of the welded material 101. However, the spot diameter of the measurement beam of the optical interferometer 105 on the surface of the welded material 101 may be set larger than the spot diameter of the laser beam of the laser oscillator 107 on the surface of the welded material 101. It is known that in such a case, a distribution having a high reflection intensity always appears in an unmolten portion in the two-dimensional tomographic image data. Although details thereof are omitted, in such a case, the method for measuring the penetration depth described in the above embodiments can be applied as well.

In the above-described embodiment, in step S105 shown in FIG. 3, it is determined whether the sampling by the A/D converter 119 is to be ended, and the processing proceeds to step S106 and the following steps only when the sampling is ended. However, the present embodiment is not limited thereto. That is, a procedure of sequentially deriving the penetration depth starting from step S106 may be performed while continuing sampling by the A/D converter 119. In this case, for example, when tomographic image data corresponding to a predetermined region in a welding direction is accumulated, a penetration depth of the corresponding region can be sequentially derived.

In the above described embodiments, the non-defective product depth range is determined based on a variation in the penetration depths of a plurality of non-defective products. However, the present embodiment is not limited thereto. For example, the non-defective product depth range may be determined based on a limitation on product design.

Third Embodiment

A laser welding apparatus in the third embodiment has the same configuration as that of the laser welding apparatus 100 of the first embodiment shown in FIG. 1.

<Operation Example of Laser Welding Apparatus>

Figure 9:
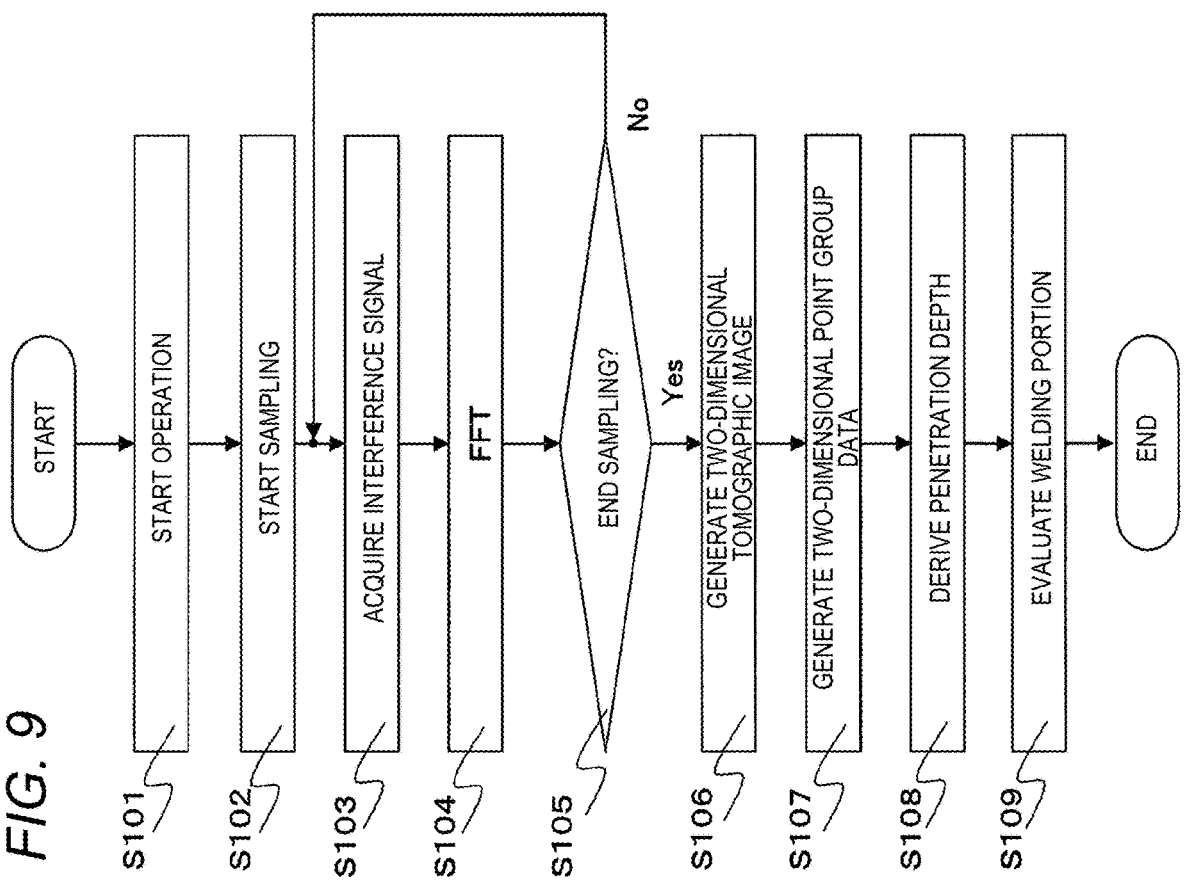
FIG. 9 is a flowchart showing an operation example of the laser welding apparatus 100 according to a third embodiment.

The operation example of the laser welding apparatus in the third embodiment is shown in FIG. 9. Operation in the third embodiment is the same as that in the flowchart shown in FIG. 3 until step S105. Step S106 and the following steps will be described below.

In step S106, the derivation unit 112b reads an execution result of an FFT for an interference signal and generates two-dimensional tomographic image data based on the result.

Figure 10A:
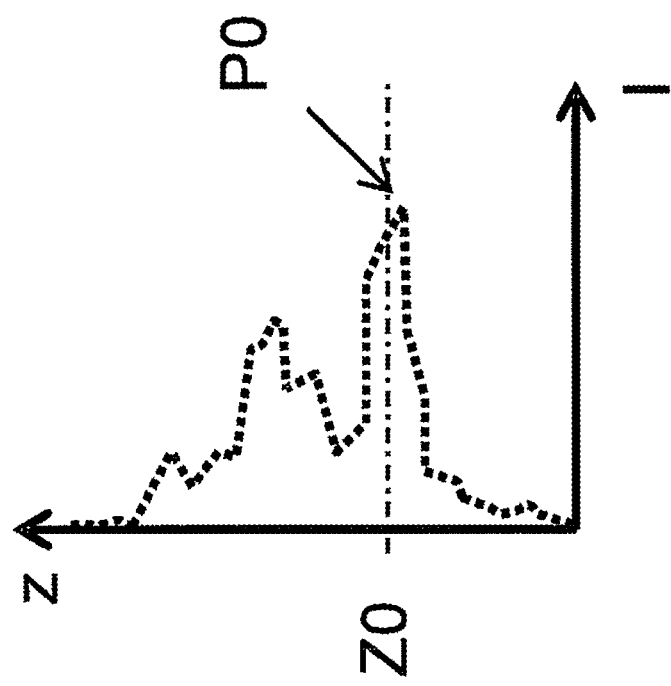
FIG. 10A is a diagram showing a correlation between a distance in a depth direction of the welding portion and an intensity of an interference signal at a measurement point of the welded material according to the third embodiment.

FIG. 10A is a diagram showing a correlation between a distance (hereinafter, simply referred to as a depth) in a depth direction of the welding portion 102 and an intensity I of the interference signal at one point (hereinafter, referred to as a measurement point) in a welding direction of the welded material 101. The welding direction is a proceeding direction of laser welding and corresponds to the x-axis direction in FIG. 1. The depth direction corresponds to the z-axis direction shown in FIG. 1. An upward direction corresponds to an upper side of the welding portion 102, that is, aside on which the depth is small. A downward direction corresponds to a lower side of the welding portion 102, that is, a side on which the depth is large. In this manner, acquiring information on a depth of the measurement point is generally referred to as A-scan, and data acquired by the A-scan is referred to as A-scan data.

Figure 10B:
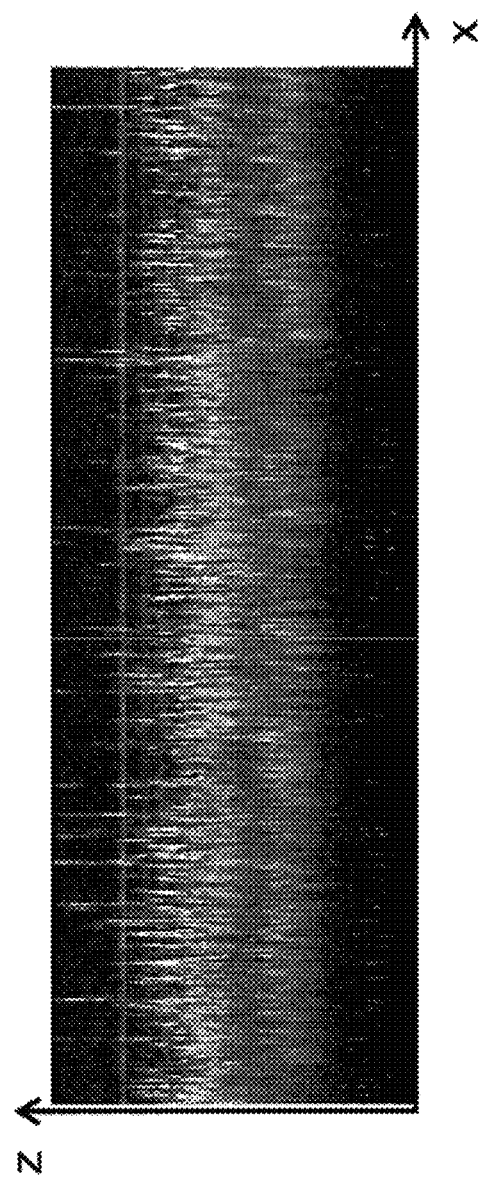
FIG. 10B is diagram showing an example of B-scan data according to the third embodiment.

The A-scan is performed along the proceeding direction of the laser welding, whereby two-dimensional tomographic image data on the welding direction, the depth direction, and the intensity of the interference signal can be acquired. The two-dimensional tomographic image data is generally referred to as B-scan data. FIG. 10B is a diagram showing an example of the B-scan data. In FIG. 10B, a vertical axis z indicates the depth direction (corresponding to the z-axis direction shown in FIG. 1), a horizontal axis x indicates the welding direction (corresponding to the x-axis direction shown in FIG. 1), and light and shade on the image indicates the intensity I of the interference signal.

In step S107, the derivation unit 112b specifies the depth of the welding at each measurement point in the welding direction based on the two-dimensional tomographic image data generated in step S106, and generates two-dimensional point group data. The two-dimensional point group data generated by the derivation unit 112b is collective data on a set of points indicating a correlation between a certain measurement point and a depth of welding at the measurement point. The depth of the welding at the measurement point in the welding direction is specified, for example, as the intensity of the interference signal at the measurement point, that is, as a distance at which an intensity of reflection of a measurement beam by the welding portion 102 is maximized.

In order to specify the depth of the welding at the measurement point in the welding direction, the A-scan data as shown in FIG. 10A is used. Specifically, the derivation unit 112b refers to the A-scan data at the measurement point, and sets a depth corresponding to a peak having the largest intensity I of the interference signal as the depth of the welding at the measurement point. In the example shown in FIG. 10A, a depth Z0 corresponding to a peak P0 having the strongest intensity of the interference signal is the depth of the welding at the measurement point corresponding to FIG. 10A.

Figure 10C:
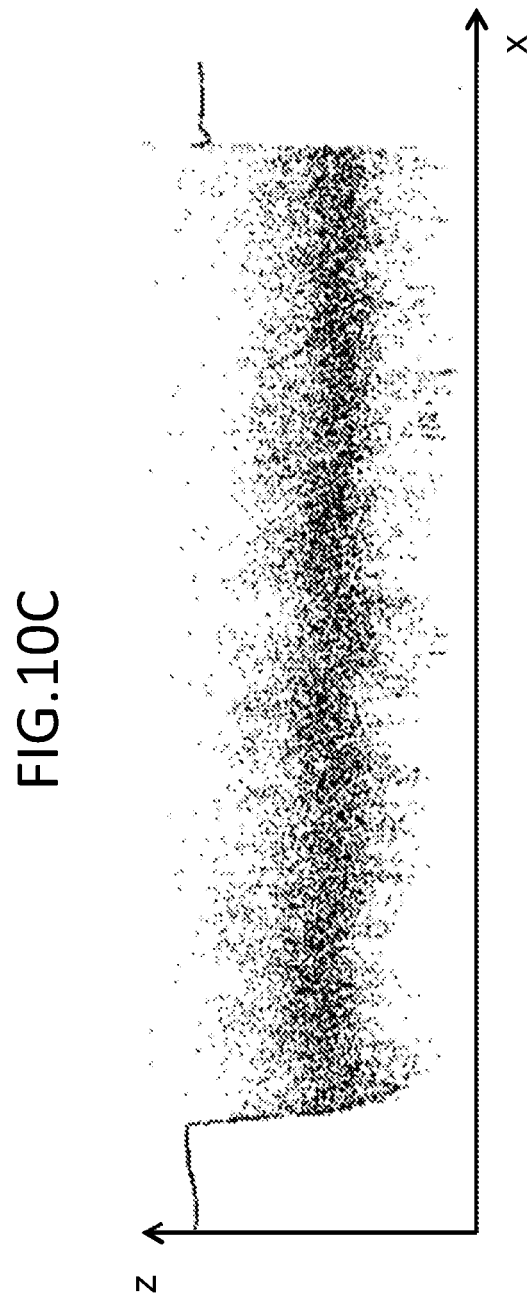
FIG. 10C is a diagram showing an example of two-dimensional point group data according to the third embodiment.

The two-dimensional point group data is generated by plotting, on a two-dimensional plane, the points indicating a correlation between the position of the measurement point in the welding direction and the depth of the welding specified for each measurement point as described above. FIG. 10C is a diagram showing an example of the two-dimensional point group data. In FIG. 10C, a vertical axis z indicates the depth of the welding, and a horizontal axis I indicates the welding direction.

In step S108, the derivation unit 112b derives the penetration depth of the welding portion 102 based on the two-dimensional point group data generated in step S107. A method for deriving the penetration depth in step S108 will be described in detail below. In step S109, the evaluation unit 112c evaluates the welding portion 102 based on the derived penetration depth.

<Method for Deriving Penetration Depth of Welding Portion>

Figure 11:
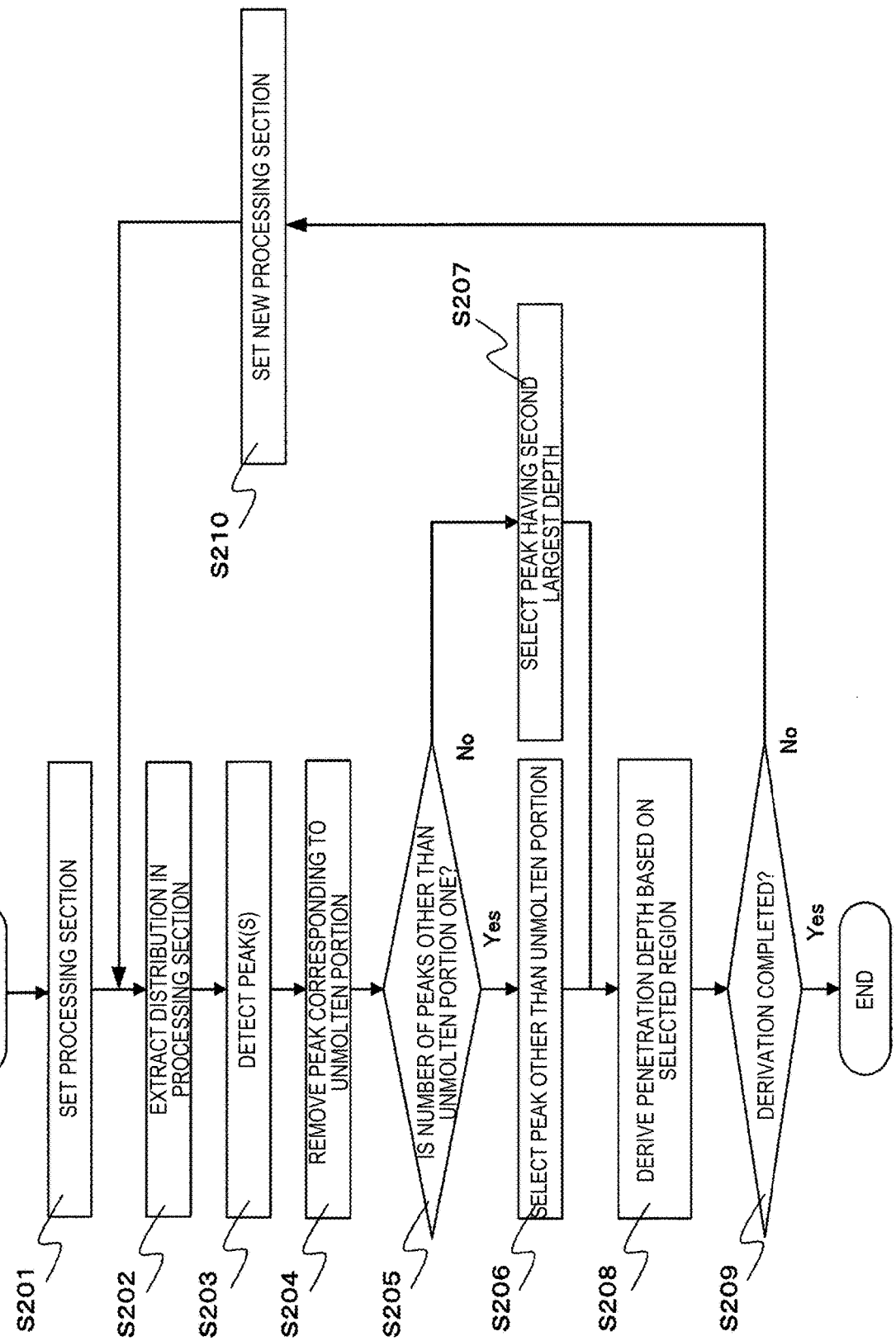
FIG. 11 is a flowchart showing a method for deriving a penetration depth of the welding portion according to the third embodiment.

Next, the method for deriving the penetration depth of the welding portion 102 in step S108 will be described in detail. FIG. 11 is a flowchart showing the method for deriving the penetration depth of the welding portion 102.

In step S201, the derivation unit 112b sets a predetermined processing section in the two-dimensional point group data generated in step S107 of FIG. 9.

The predetermined processing section is a small section set in a section whose penetration depth is to be derived (hereinafter, referred to as a target section). The term "target section" means, for example, a section in the welding direction corresponding to the welding portion 102 welded by the laser welding function of the laser welding apparatus 100.

Figure 12:
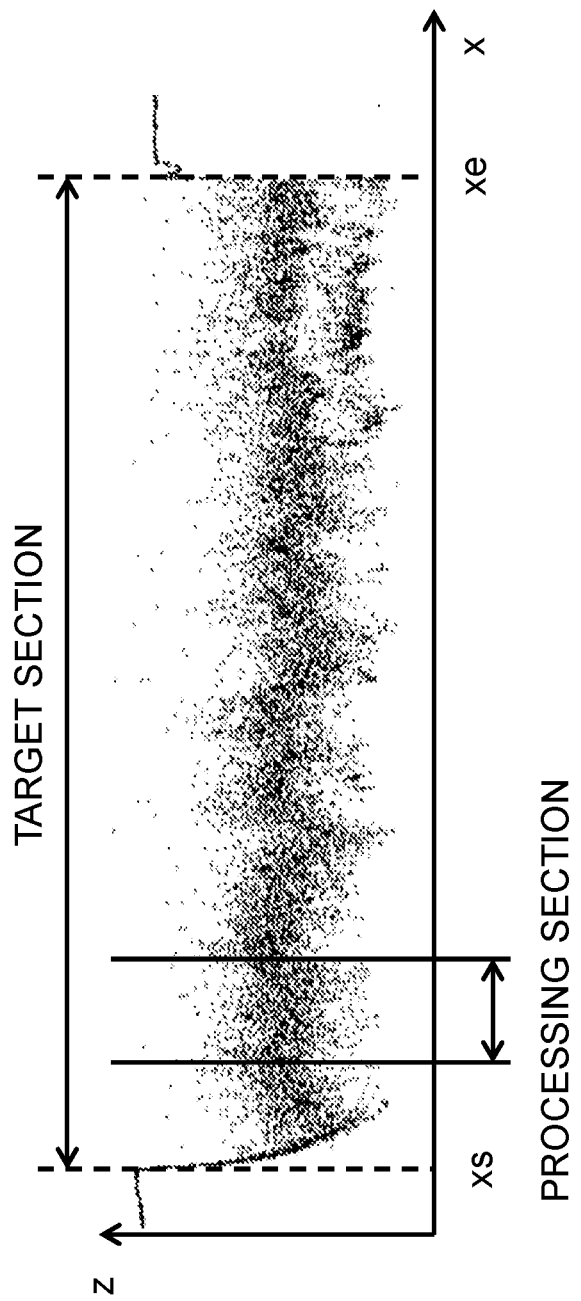
FIG. 12 is a diagram showing a target section and a processing section according to the third embodiment.

FIG. 12 is a diagram showing the target section and the processing section. FIG. 12 shows an example of the two-dimensional point group data generated by the derivation unit 112b. In the example shown in FIG. 12, the target section is a section from a position xs to a position xe in the welding direction. On the other hand, the processing section is an optional section narrower than the target section and is a section included in the target section.

Figure 13A:
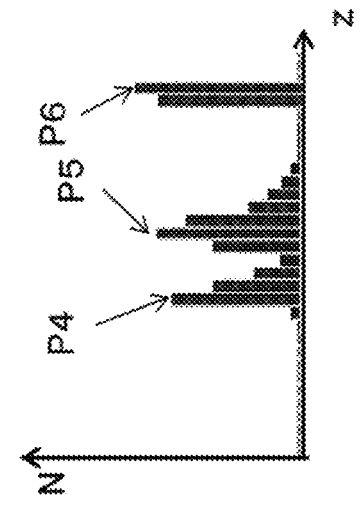
FIG. 13A is a diagram showing an example of a distribution of distance in the depth direction in the two-dimensional point group data according to the third embodiment.
Figure 13B:
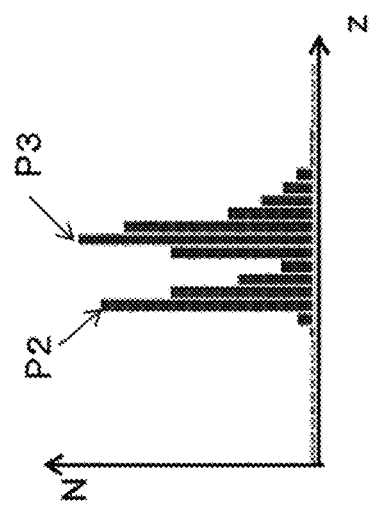
FIG. 13B is a diagram showing an example of the distribution of the distance in the depth direction in the two-dimensional point group data according to the third embodiment.
Figure 13C:
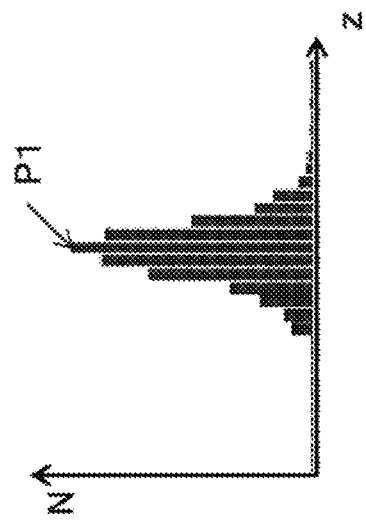
FIG. 13C is a diagram showing an example of the distribution of the distance in the depth direction in the two-dimensional point group data according to the third embodiment.

In step S202, the derivation unit 112b generates information on a distribution of points in the depth direction of the two-dimensional point group data within the set processing section. FIGS. 13A to 13C are diagrams showing examples of the information on the distribution of the points in the depth direction of the two-dimensional point group data respectively extracted from different processing sections. In FIGS. 13A to 13C, the distribution of the points in the point group data is represented as a histogram. In FIGS. 13A to 13C, a horizontal axis indicates the depth of the welding (corresponding to the z-axis shown in FIG. 1), and a vertical axis indicates a count N. The count N means the number of points of the two-dimensional point group data included in a width divided by a constant distance in the depth direction (a bin). A width of the bin may be set to an optional width. In FIGS. 13A to 13C, a direction of the horizontal axis of the depth of the welding indicates that the depth of the welding is larger toward a left side and is smaller toward a right side (closer to the surface of the welded material 101).

In step S203, the derivation unit 112b detects peaks of the distribution extracted in step S202. The peak corresponds to a region (a high-density region) in which a density of the points is high in the depth direction in the original two-dimensional point group data. For example, in the example shown in FIG. 13A, one peak P1 is detected. In the example shown in FIG. 13B, two peaks P2 and P3 are detected. In the example shown in FIG. 13C, three peaks P4, P5 and P6 are detected.

In step S204, the derivation unit 112b removes a peak corresponding to an unmolten portion from the peaks detected in step S203. The unmolten portion means a portion not molten on the surface of the welded material 101. In the laser welding apparatus 100 in the present embodiment, since a distance from the optical interferometer 105 to the surface of the welded material 101 is always constant, when the unmolten portion exists on the surface of the welded material 101, an interference signal generated by a measurement beam reflected by the unmolten portion should indicate a constant depth in the depth direction of the welding. That is, in the laser welding apparatus 100, when the unmolten portion exists on the surface of the welded material 101, a depth of the peak generated by the interference signal from the unmolten portion is specified in advance and stored as unmolten portion peak information. The derivation unit 112b removes a peak having a depth that coincides with the depth from the peaks detected in step S203 by using the unmolten portion peak information, thereby removing the peak corresponding to the unmolten portion.

In the examples shown in FIGS. 13A to 13C, for example, it is assumed that the peak P6 shown in FIG. 13C is the peak corresponding to the unmolten portion and is removed.

In step S205, the derivation unit 112b determines whether a number of peaks not removed in step S204 is one. When it is determined that there is one peak not removed (Yes in step S205), the processing proceeds to step S206. On the other hand, when it is determined that there are more than one peaks (a plurality of peaks) not removed (No in step S205), the processing proceeds to step S207.

In the examples shown in FIGS. 13A to 13C, the determination in step S205 is as follows. In the processing section of FIG. 13A, since it is determined that there is one peak (P1) not removed, the processing proceeds to step S206. In the processing section of FIG. 13B, since it is determined that there are two peaks not removed (P2, P3), the processing proceeds to step S207. Further, in the processing section of FIG. 13C, since it is determined that the peak P6 is removed in step S204 and there are two peaks not removed (P4, P5), the processing proceeds to step S207.

In step S206, the derivation unit 112b selects the one peak not removed in step S204 as a peak for deriving the penetration depth of the welding portion 102. On the other hand, in step S207, the derivation unit 112b selects the second deepest peak among the plurality of peaks not removed in step S204 as the peak for deriving the penetration depth.

In FIGS. 13B and 13C, the left side of the z-axis corresponds to a direction in which the depth is large, and the right side of the z-axis corresponds to a direction in which the depth is small. Therefore, in the example shown in FIG. 13B, the peak P3 that is the second deepest peak is selected in step S207. On the other hand, in the example shown in FIG. 13C, the peak P5 that is the second largest peak is selected in step S207.

In step S208, the derivation unit 112b derives a penetration depth of the processing section set in step S201 based on the peak (s) selected in step S206 or step S207. Examples of a method for deriving the penetration depth include, for example, a method in which a preset offset amount is subtracted from a depth corresponding to the selected peak. The offset amount is a correction value acquired in advance. As the method for deriving the penetration depth by using the selected peak(s), for example, in addition to the above-described method, a depth at which penetration is the deepest may be detected from depth (s) of the selected peak(s), and the penetration depth may be directly derived based on the detected depth.

In step S209, the derivation unit 112b determines whether the derivation of the penetration depth is to be ended. For example, the derivation unit 112b determines whether derivation of the penetration depths is completed in the entire region of the target section whose penetration depth is derived, thereby determining whether the derivation of the penetration depth is to be ended. When it is determined that the derivation of the penetration depth is to be ended (Yes in step S209), the derivation unit 112b ends the processing. On the other hand, if not (No in step S209), the processing proceeds to step S210.

In step S210, the derivation unit 112b newly sets a section that is still not a processing section as a processing section in the target section, and then returns the processing to step S202. Steps S202 to S210 are repeated in this manner, thereby completing the derivation of the penetration depths in the entire region of the target section.

The above is the method for deriving the penetration depth in the laser welding apparatus 100. In the example shown in FIG. 11, the processing section is an optional section in the target section, but the present embodiment is not limited thereto. For example, a mode may be adopted in which the processing section is sequentially shifted from a start position to an end position of the target section as the processing proceeds.

<Effects of Method for Deriving Penetration Depth in Present Embodiment>

Figure 14B:
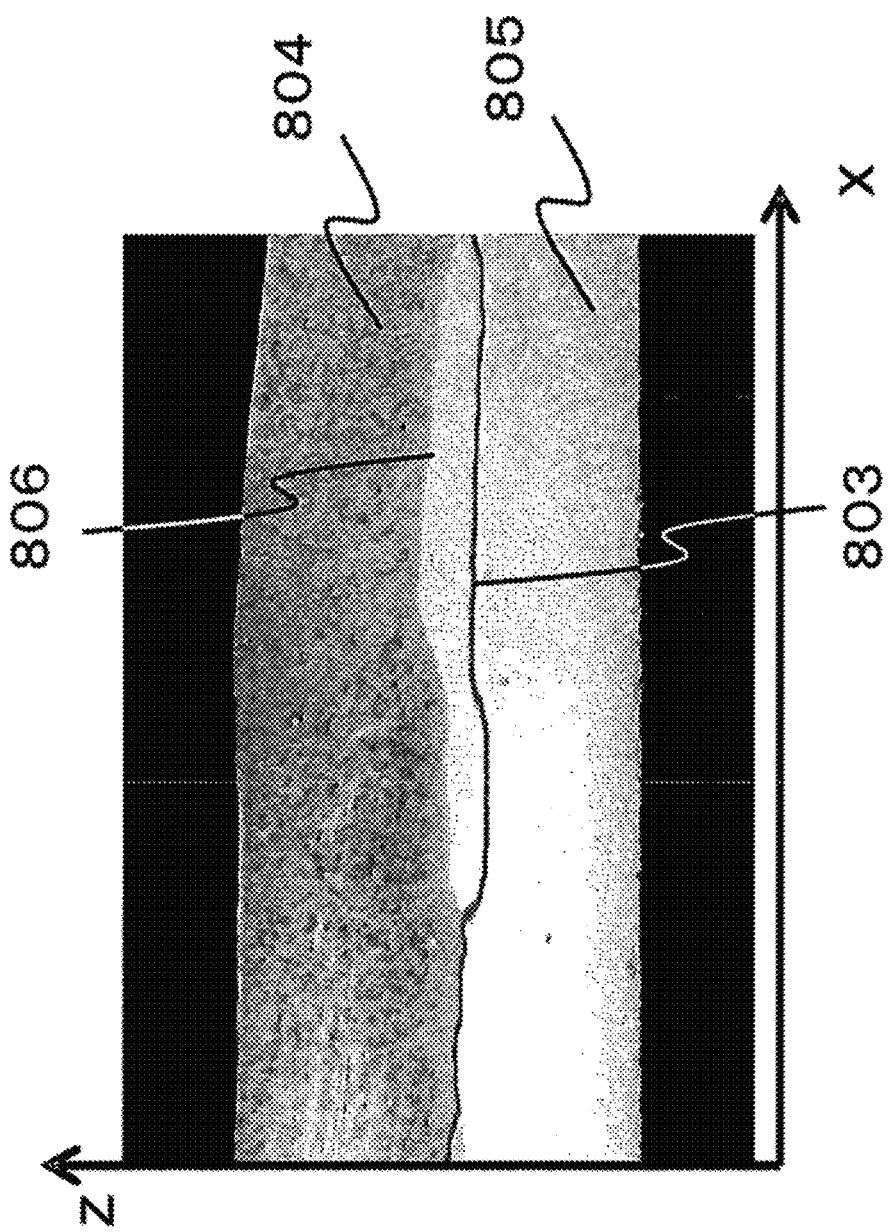
FIG. 14B is a diagram showing a result of the penetration depth derived by the method of the related art for deriving the penetration depth.
Figure 14C:
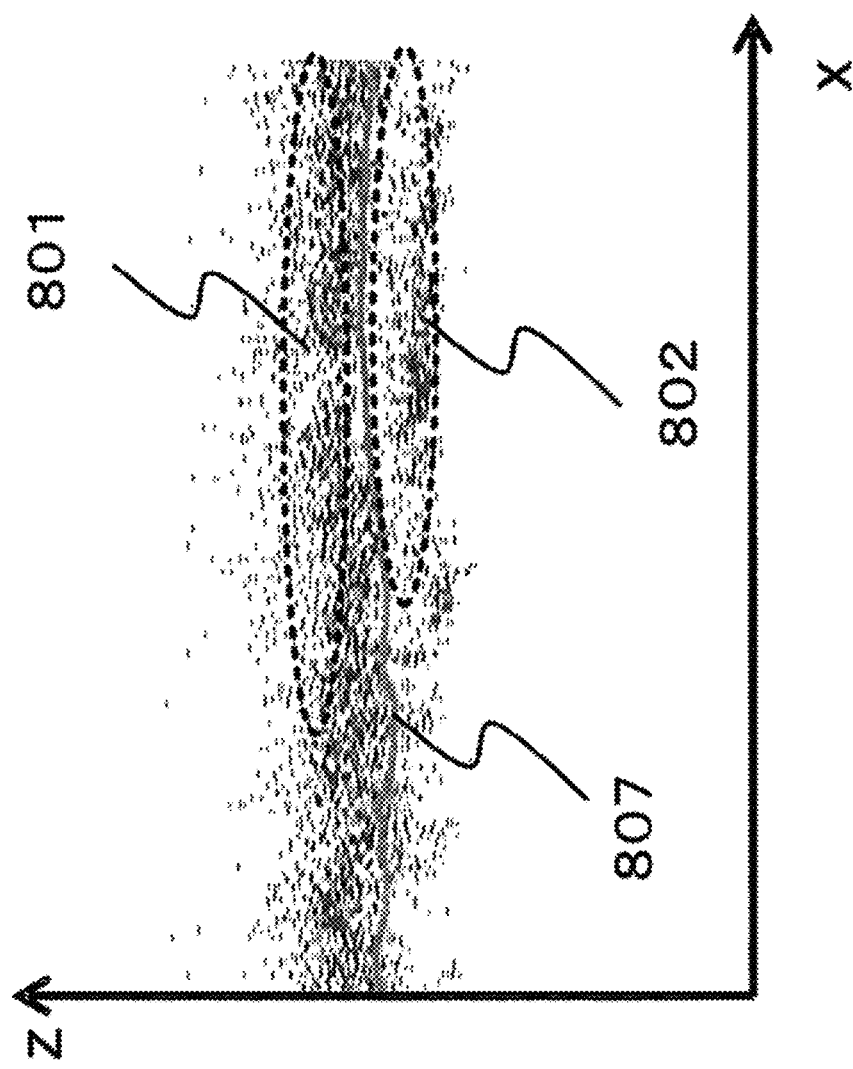
FIG. 14C is a diagram showing a result of the penetration depth derived by the method according to the third embodiment.
Figure 14D:
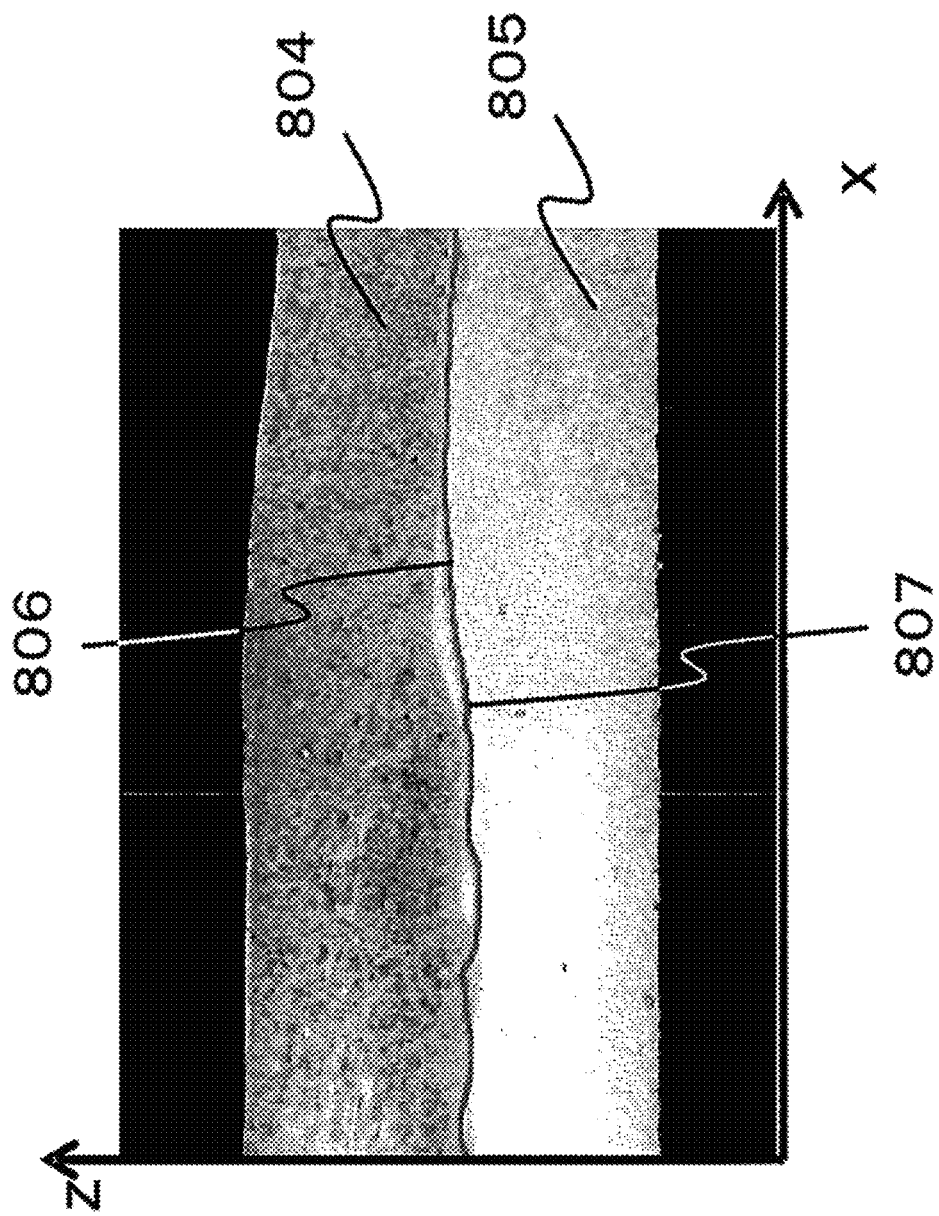
FIG. 14D is a diagram showing a result of the penetration depth derived by the method according to the third embodiment.
Figure 15:
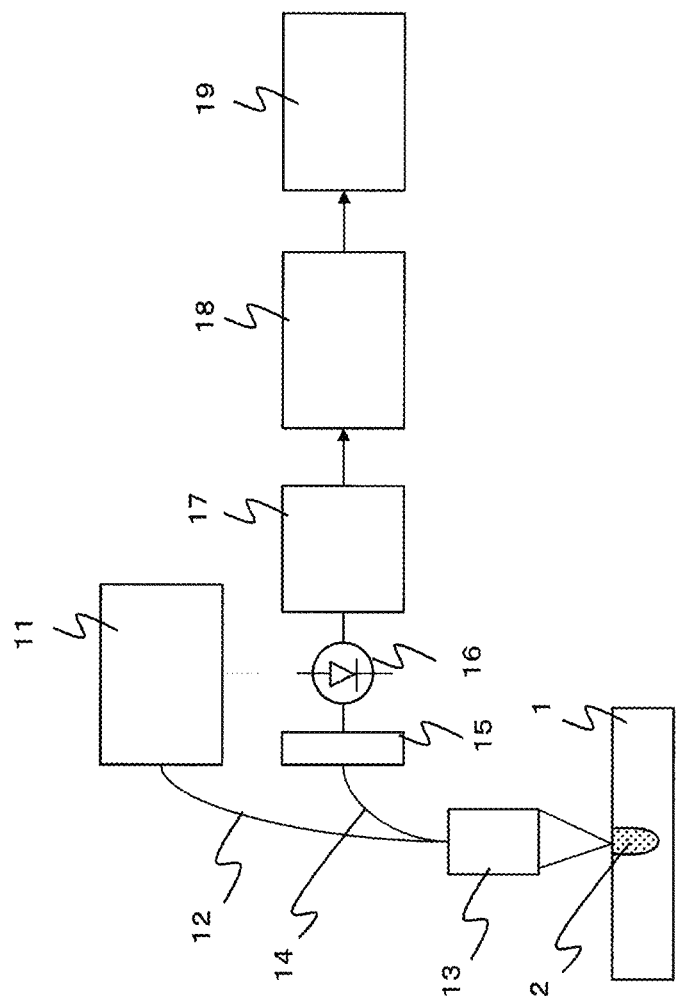
FIG. 15 is a diagram showing an example of a first laser welding apparatus of related art.

Hereinafter, the effects of the method for deriving the penetration depth in the present embodiment will be described using specific examples. FIGS. 14A and 14B are diagrams showing results of a penetration depth derived by a method of related art for deriving the penetration depth. FIGS. 14C and 14D are diagrams showing results of the penetration depth derived by the method for deriving the penetration depth in the above-described present embodiment.

FIG. 14A shows the result acquired by superimposing the penetration depth, which is derived by the method of the related art for deriving the penetration depth, on two-dimensional point group data used for the derivation of the penetration depth. In the two-dimensional point group data shown in FIG. 14A, a high-density region is divided into a first region 801 having a relatively small depth and a second region 802 having a relatively large depth. A phenomenon in which a plurality of high-density regions appear in such a manner is considered to occur due to a variation in an interference signal measured by the optical interferometer 105 when a formation state of the keyhole 104 during welding is not constant (see FIG. 1).

As an example, a penetration depth 803, which is derived by the method of the related art for deriving the penetration depth and is shown in FIGS. 14A and 14B, is derived by adopting a method in which the deepest point in the two-dimensional point group data is set as the penetration depth. Therefore, in FIG. 14A, the penetration depth 803 exists in the vicinity of the second region 802.

FIG. 14B shows the result acquired by superimposing the penetration depth 803, which is derived by the method of the related art for deriving the penetration depth, on a cross-sectional photograph of an actual welded material. In the cross-sectional photograph of the actual welded material 101 shown in FIG. 14B, an etching processing is performed after polishing, so that a molten portion 804 and an unmolten portion 805 can be seen clearly. As shown in FIG. 14B, for the penetration depth 803 derived by the method of the related art for deriving the penetration depth, an error from a boundary portion (a penetration portion) 806 between the actual molten portion 804 and the unmolten portion 805 increases depending on a position in a welding direction.

On the other hand, FIG. 14C shows the result acquired by superimposing a penetration depth 807, which is derived by the method for deriving the penetration depth in the above-described present embodiment, on two-dimensional point group data used to derive the penetration depth. The two-dimensional point group data shown in FIG. 14C is the same as that of FIG. 14A.

As described above, in the method for deriving the penetration depth in the present embodiment, when the plurality of peaks corresponding to the high-density region exist in one processing section in the distribution of the points in the depth direction of the two-dimensional point group data, the peak having the second largest depth is adopted to derive the penetration depth. This is because that when there are a plurality of high-density regions in the two-dimensional point group data except for the unmolten portion, it is empirically known that the penetration depth can be derived with higher accuracy by adopting the high-density region having the second largest depth than adopting a high-density region having the largest depth.

Accordingly, as shown in FIG. 14C, the penetration depth 807 derived by the method for deriving the penetration depth in the present embodiment exists at a position having a depth smaller than that of the penetration depth 803 acquired by adopting the method of the related art shown in FIG. 14A.

FIG. 14D shows the result acquired by superimposing the penetration depth 807, which is derived by the method for deriving the penetration depth in the present embodiment, on a cross-sectional photograph of an actual welded material. As can be seen with reference to FIG. 14D, the penetration depth 807 based on the method for deriving the penetration depth in the present embodiment is closer to the actual penetration portion 806 than the penetration depth 803 based on the method of the related art for deriving the penetration depth shown in FIG. 14B.

As described above, according to the laser welding apparatus 100 in the third embodiment, the penetration depth of the welding portion can be accurately measured even when the formation state of the keyhole during the welding is not constant. Therefore, according to the laser welding apparatus 100 in the present embodiment, the quality of the welding portion can be evaluated based on the correct penetration depth, and the quality of the welding portion can be accurately evaluated.

Modification

Although various embodiments have been described above with reference to the accompanying drawings, the present embodiment is not limited to such examples. It is apparent to those skilled in the art that various changes or modifications can be conceived within the scope of the claims, and it should be understood that these changes or modifications also naturally belong to the technical scope of the present embodiment. Constituent elements in the above-described embodiments may be optionally combined within a range not departing from the spirit of the present disclosure.

In the above-described embodiments, the movement stage 110 that moves the welded material 101 on the irradiated side is adopted as a unit that moves the irradiation position of the laser beam for welding. The present embodiment is not limited thereto. The first beam condensing optical system 109 and the like that is the side from which a laser beam for welding is emitted may be moved. Examples of a unit that moves the first beam condensing optical system 109 and the like include, for example, a galvano scanner and a robot arm.

In the above-described embodiments, the penetration depth is measured using a principle of the SS-OCT in which the scanning is performed by changing the frequency in accordance with laser oscillation. An OCT includes a time domain OCT (TD-OCT) that measures a distance of an object by moving a reference mirror. However, when the TD-OCT is applied to the present embodiment, it is necessary to move the reference mirror at a very high speed in accordance with the laser oscillation, which is difficult to implement. Therefore, it is preferable to adopt the SS-OCT instead of the TD-OCT as a penetration depth measurement mechanism in the present embodiment.

In the above-described embodiments, it is assumed that welding conditions (the intensity of the laser beam for the welding, a moving speed of the welded material 101, and the like) are not changed after the welding is started. However, for example, before a penetration depth measured by the derivation unit 112$b$ is outside the desired depth range, the control unit 112$a$ may change the welding conditions to prevent occurrence of a defective product in advance. In this case, a range of the penetration depth for changing the welding conditions (a welding condition holding range) is newly set. When detecting that the measured penetration depth deviates from the welding condition holding range before deviating from the non-defective product depth range, the derivation unit 112b causes the control unit 112a to change the welding conditions. The control unit 112a may change the welding conditions by adjusting the output intensity of the laser beam and the moving speed of the welded material 101.

In the above-described embodiments, it is assumed that a spot diameter of the measurement beam of the optical interferometer 105 on the surface of the welded material 101 is smaller than a spot diameter of the laser beam of the laser oscillator 107 on the surface of the welded material 101. However, the spot diameter of the measurement beam of the optical interferometer 105 on the surface of the welded material 101 may be set larger than the spot diameter of the laser beam of the laser oscillator 107 on the surface of the welded material 101. It is known that in such a case, a distribution having a high reflection intensity always appears in an unmolten portion in the two-dimensional tomographic image data. Although details thereof are omitted, in such a case, the method for measuring the penetration depth described in the above embodiments can be applied as well.

In the above-described embodiment, in step S105 shown in FIG. 9, it is determined whether the sampling by the A/D converter 119 is to be ended, and the processing proceeds to step S106 and the following steps only when the sampling is to be ended. However, the present embodiment is not limited thereto. That is, a procedure of sequentially deriving the penetration depth starting from step S106 may be performed while continuing the sampling by the A/D converter 119. In this case, for example, when tomographic image data corresponding to a predetermined region in a welding direction is accumulated, a penetration depth of the corresponding region can be sequentially calculated.

In the above-described embodiment, the derivation unit 112b extracts, by the method for detecting the peak(s) in the histogram, the high-density region (a distribution of depths) in which the density of the points is high in the depth direction for each processing section in the welding direction of the two-dimensional point group data. However, the present embodiment is not limited thereto. For example, the derivation unit 112b may extract the high-density region by feature extraction or the like of the distribution based on kernel density estimation or image processing.

In the above-described embodiment, in step S105 shown in FIG. 9, it is determined whether the sampling by the A/D converter 119 is to be ended, and the processing proceeds to step S106 and the following steps only when the sampling is to be ended. However, the present embodiment is not limited thereto. That is, the procedure of sequentially deriving the penetration depth starting from step S106 may be performed while continuing the sampling by the A/D converter 119. In this case, for example, when the tomographic image data corresponding to a predetermined region in the welding direction is accumulated, the penetration depth of the corresponding region can be sequentially derived.

(Overall)

The first to the third embodiments can be combined.

According to the first to the third embodiments, it can be said that the present embodiment provides a laser welding apparatus including: a laser oscillator configured to emit a laser beam toward a welding portion of a welded material; an optical interferometer configured to generate an interference signal that indicates an intensity of an interference beam including a measurement beam reflected by the welding portion and a reference beam; and a derivation unit configured to generate, based on the interference signal, two-dimensional tomographic image data indicating a correlation among a distance in a proceeding direction of welding of the welding portion, a depth of the welding, and an intensity of the interference signal, to extract specified depth tomographic image data within a specified range from the two-dimensional tomographic image data, and to derive a depth for each distance based on the intensity of the interference signal in the specified depth tomographic image data.

The present disclosure can be applied to a laser welding apparatus that performs laser welding of an automobile, an electronic component, and the like.

What is claimed is:

1. A laser welding apparatus comprising:
   a laser oscillator configured to emit a laser beam toward a welding portion of a welded material;
   an optical interferometer configured to generate an interference signal that indicates an intensity of an interference beam including a measurement beam reflected by the welding portion and a reference beam; and
   a computer configured to:
      generate, based on the interference signal, two-dimensional tomographic image data indicating a correlation among a distance in a proceeding direction of welding of the welding portion, and an intensity of the interference signal along a depth direction,
      extract specified depth tomographic image data within a specified range from the two-dimensional tomographic image data, and
      derive a welding depth for each distance corresponding to a peak intensity of the interference signal within the specified depth tomographic image data,
   wherein:
      the specific range of the specified depth tomographic image data is defined along the depth direction, and
      the specified range is set based on a reference value of depth set in advance.

2. The laser welding apparatus according to claim 1, wherein the computer is further configured to evaluate a quality of the welding in the welding portion based on the welding depth derived for each distance.

3. The laser welding apparatus according to claim 1, wherein the specified range is set to a second range wider than a first range set based on the reference value.

4. The laser welding apparatus according to claim 1, wherein the specified range has an upper limit value and a lower limit value which are set to vary in accordance with variation in the reference value when the reference value varies depending on the distance in the proceeding direction of the welding of the welding portion.

5. A laser welding apparatus comprising:
   a laser oscillator configured to emit a laser beam toward a welding portion of a welded material;
   an optical interferometer configured to generate an interference signal that indicates an intensity of an interference beam including a measurement beam reflected by the welding portion and a reference beam; and
   a computer configured to:
      generate, based on the interference signal, two-dimensional tomographic image data indicating a correlation among a distance in a proceeding direction of welding of the welding portion, and an intensity of the interference signal along a depth direction,
      extract specified depth tomographic image data within a specified range from the two-dimensional tomographic image data, derive a welding depth for each distance corresponding to a peak intensity of the interference signal within the specified depth tomographic image data, generate, based on the interference signal, point group data indicating a correlation between the distance in the proceeding direction of the welding of the welding portion and the welding depth of the welding, extract a high-density region in which a density of points in the point group data is high in a depth direction of the welding, and when a plurality of high-density regions exists, derive a penetration depth of one of the welding portions based on a depth of the high-density region in which the welding depth is the second largest.

6. The laser welding apparatus according to claim 5, wherein the computer is configured to derive the penetration depth of the welding portion for each predetermined section provided in the proceeding direction of the welding in the point group data.

7. The laser welding apparatus according to claim 6, wherein the computer is configured, when only one high-density region exists, to derive the penetration depth of the welding portion in the predetermined section based on the depth of the high-density region.

8. The laser welding apparatus according to claim 6, wherein the computer is configured, when the depth of the extracted high-density region satisfies a condition set in advance, not to use the high-density region that satisfies the condition to derive the penetration depth of the welding portion.

9. The laser welding apparatus according to claim 6, wherein the computer is configured to extract the high-density region in the point group data by using a peak of a histogram indicating a distribution in the depth direction of the welding of the points in the point group data included in the predetermined section.

* * * * *